(12) United States Patent
Kameyama et al.

(10) Patent No.: US 10,841,218 B2
(45) Date of Patent: Nov. 17, 2020

(54) COMMUNICATION RELAY DEVICE AND COMMUNICATION RELAY METHOD

(71) Applicant: FUJITSU LIMITED, Kawasaki (JP)

(72) Inventors: Hiroaki Kameyama, Kawasaki (JP); Shinichi Sazawa, Atsugi (JP); Tomoyuki Furutono, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 38 days.

(21) Appl. No.: 16/181,424

(22) Filed: Nov. 6, 2018

(65) Prior Publication Data
US 2019/0173785 A1 Jun. 6, 2019

(30) Foreign Application Priority Data

Dec. 1, 2017 (JP) ................................ 2017-231984
Jul. 19, 2018 (JP) ................................ 2018-135777

(51) Int. Cl.
*H04L 12/26* (2006.01)
*H04K 1/00* (2006.01)
(Continued)

(52) U.S. Cl.
CPC .............. *H04L 45/74* (2013.01); *H04L 45/70* (2013.01); *H04W 40/246* (2013.01); *H04W 40/22* (2013.01)

(58) Field of Classification Search
CPC .... H04W 40/246; H04W 40/22; H04L 45/70; H04L 63/0428; H04L 63/166;
(Continued)

(56) References Cited

U.S. PATENT DOCUMENTS 9,634,934 B2 * 4/2017 Thyamagundalu ... H04L 45/741
2004/0202177 A1 * 10/2004 Tachikawa .......... H04L 12/5601
370/395.1
(Continued)

FOREIGN PATENT DOCUMENTS

| JP | 2002-9787 | 1/2002 |
|---|---|---|
| JP | 2005-151533 | 6/2005 |
| WO | 2015-162753 | 10/2015 |

OTHER PUBLICATIONS

Zhang, Yan et al., "On Wide Area Network Optimization", IEEE Communications Surveys & Tutorials, vol. 14, No. 4, Fourth Quarter 2012 (24 pages).

*Primary Examiner* — Edan Orgad
*Assistant Examiner* — Vanneilian Lalchinthang
(74) *Attorney, Agent, or Firm* — Fujitsu Patent Center

(57) ABSTRACT

A communication relay device receives a packet transmitted from a first communication device to a second communication device and forwards the packet to a correspondent communication relay device. The communication relay device includes: a processor and a communication processor. The processor extracts, from a request packet that requests a connection to the second communication device, a first identifier for indicating the first communication device, when the communication relay device receives the request packet from the first communication device, and generates configuration information including the first identifier. The communication processor transmits the configuration information to the correspondent communication relay device such that the correspondent communication relay device converts source information of the packet transmitted from the first communication device to the second communication device into the first identifier and forwards the packet for which the source information has been converted to the second communication device.

4 Claims, 15 Drawing Sheets

(51) Int. Cl.
*H04L 12/741* (2013.01)
*H04L 12/721* (2013.01)
*H04W 40/24* (2009.01)
*H04W 40/22* (2009.01)

(58) Field of Classification Search
CPC ..... H04L 69/16; H04L 45/74; H04L 12/2676;
H04L 47/193; H04L 47/40
USPC ........................................................ 370/392
See application file for complete search history.

(56) References Cited

U.S. PATENT DOCUMENTS

| | | | |
|---|---|---|---|
| 2005/0117586 A1* | 6/2005 | Ikeda | H04L 47/20 370/395.21 |
| 2008/0137855 A1* | 6/2008 | Enomoto | H04L 63/0428 380/255 |
| 2013/0010640 A1* | 1/2013 | Higuchi | H04L 41/0806 370/254 |
| 2014/0082180 A1* | 3/2014 | Mutoh | H04L 47/193 709/224 |
| 2015/0003457 A1* | 1/2015 | Sugiyama | H04L 45/74 370/392 |
| 2016/0065483 A1* | 3/2016 | Oguchi | H04L 67/06 709/217 |
| 2016/0119281 A1* | 4/2016 | Tanaka | H04W 88/16 370/392 |
| 2017/0250859 A1* | 8/2017 | Gheorghe | H04L 41/0803 |

\* cited by examiner

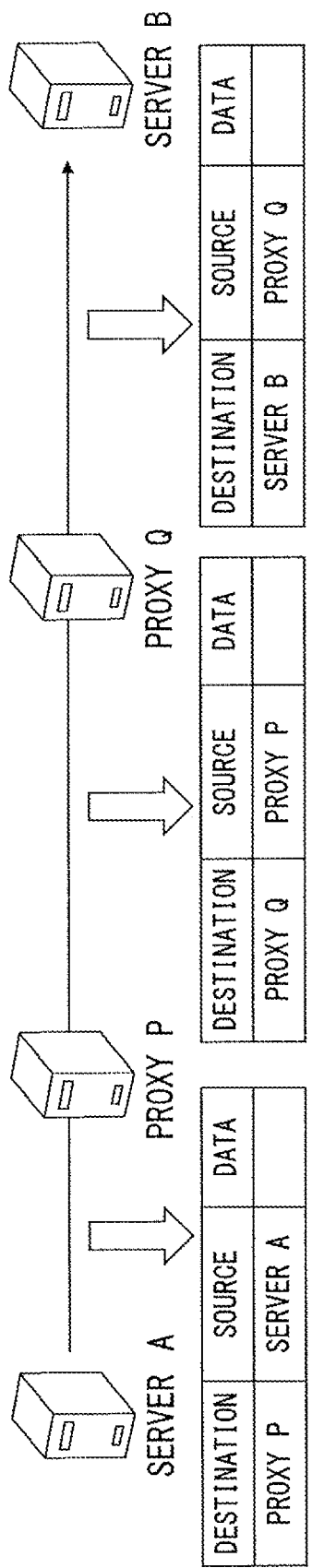
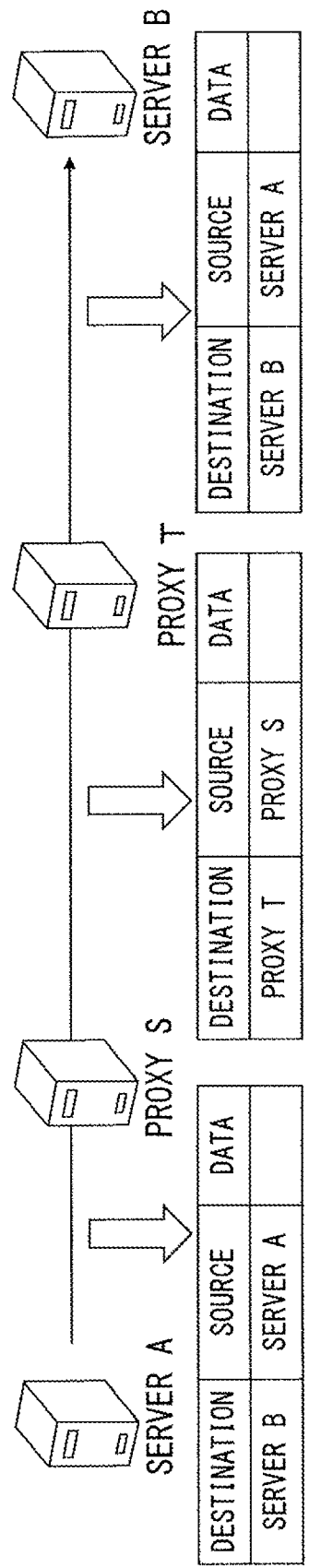
FIG. 8A
FIG. 8B

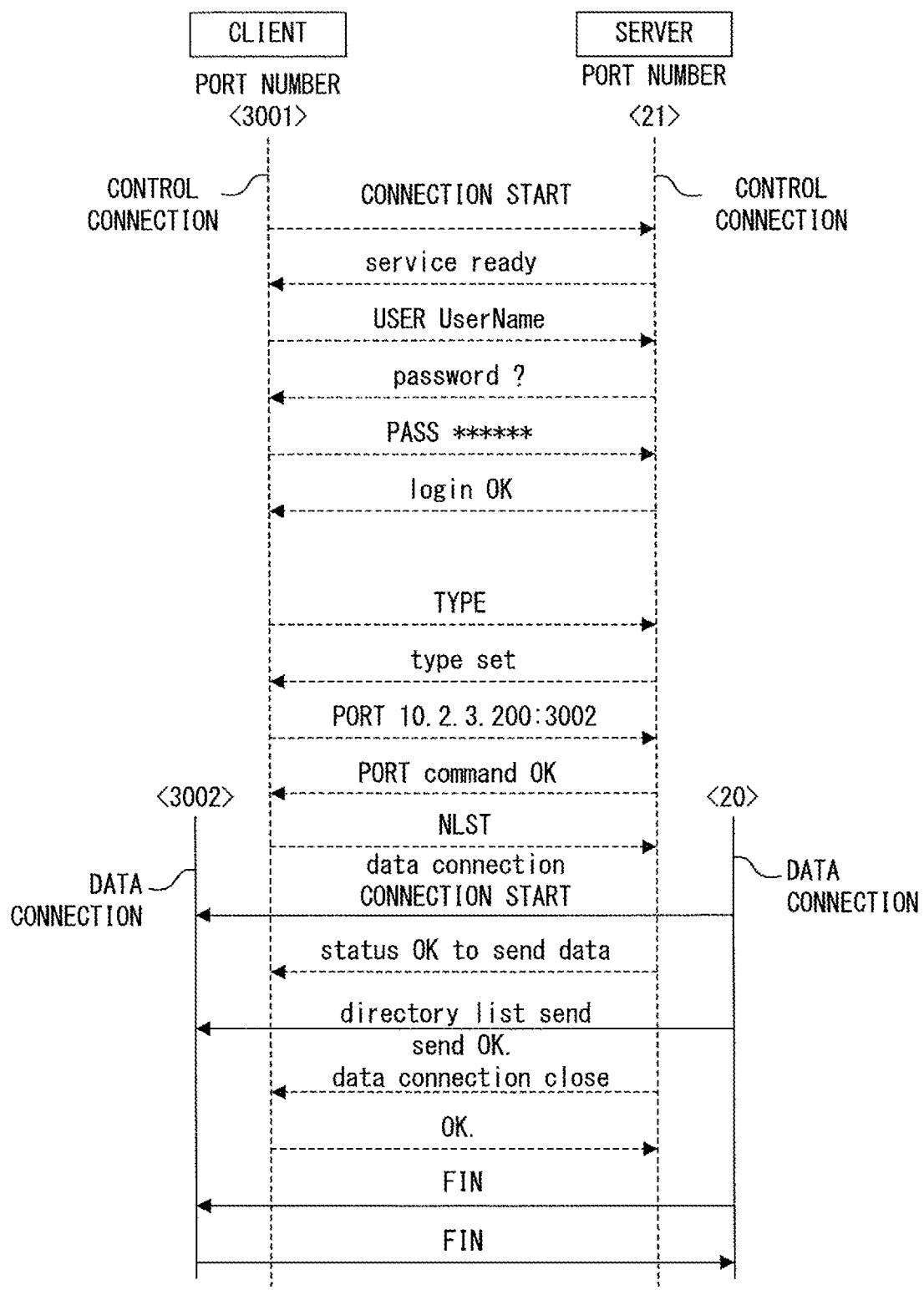
F I G. 1 1

COMMUNICATION RELAY DEVICE AND COMMUNICATION RELAY METHOD

CROSS-REFERENCE TO RELATED APPLICATIONS

This application is based upon and claims the benefit of priority of the prior Japanese Patent Application No. 2017-231984, filed on Dec. 1, 2017 and Japanese Patent Application No. 2018-135777, filed on Jul. 19, 2018, the entire contents of which are incorporated herein by reference.

FIELD

The embodiments discussed herein are related to a device and a method for relaying a packet in a network.

BACKGROUND

A high speed transfer protocol such as QUIC (Quick UDP Internet Connections), a data compression, a redundancy removal, and a proxy response are examples of technologies for accelerating a communication in a communication network such as a WAN (wide area network). Functions provided by these technologies may be implemented in each application or in a relay device. In the following descriptions, the function for accelerating a communication may be referred to as "an acceleration function".

In a configuration in which an acceleration function is implemented in each application, there may be a need to make a modification for each application if a problem occurs in the acceleration function. Thus, it may take a long time to perform a maintenance, for example, if many applications are implemented in a terminal.

On the other hand, in a configuration in which an acceleration function is implemented in a relay device, when a problem occurs in the acceleration function, the problem will often be solved by making a modification only to the relay device. Also, it is often the case that implementing an acceleration function in a relay device is lower in cost than implementing an acceleration function in each application.

Related technologies are disclosed in, for example, International Publication Pamphlet No. WO2015/162753, Japanese Laid-open Patent Publication No. 2002-009787, Japanese Laid-open Patent Publication No. 2005-151533, and Yan Zhang, Student Member, IEEE, Nirwan Ansari, Fellow, IEEE, Mingquan Wu, Member, IEEE, and Heather Yu, Member, IEEE, On Wide Area Network Optimization, IEEE COMMUNICATIONS SURVEYS & TUTORIALS, VOL. 14, NO. 4, FOURTH QUARTER 2012.

If a data transfer is accelerated by an acceleration function implemented in a relay device, it may be difficult for a reception device to identify the source of the data. For example, when a relay device in which an acceleration function is implemented relays data, the source address for the data may be converted from the IP address of a source communication device to the IP address of the relay device. In this case, it may be difficult for the reception device to identify the source of the data. Thus, for example, there is a possibility that an authentication process will not be performed. Specifically, it will be difficult for the reception device to identify the source of the data when a protocol (such as an FQDN (fully qualified domain name)) in which an address is dynamically assigned to a communication device at the time of starting communication is used.

SUMMARY

According to an aspect of the present invention, a communication relay device receives a packet transmitted from a first communication device to a second communication device from the first communication device and forwards the packet to a correspondent communication relay device. The communication relay device includes: a processor configured to extract, from a request packet that requests a connection to the second communication device, a first identifier for indicating the first communication device that is a source of the request packet and a second identifier for indicating the second communication device that is a destination of the request packet, when the communication relay device receives the request packet from the first communication device, and to generate configuration information including the first identifier and the second identifier; and a communication processor configured to transmit the configuration information to the correspondent communication relay device such that the correspondent communication relay device converts source information of the packet transmitted from the first communication device to the second communication device into the first identifier and forwards the packet for which the source information has been converted to the second communication device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 8A and 8B illustrate an example of a conventional address conversion and an example of an address conversion according to the embodiments of the present invention;

FIG. 11 illustrates an example of an FTP session;

DESCRIPTION OF EMBODIMENTS

Figure 1:
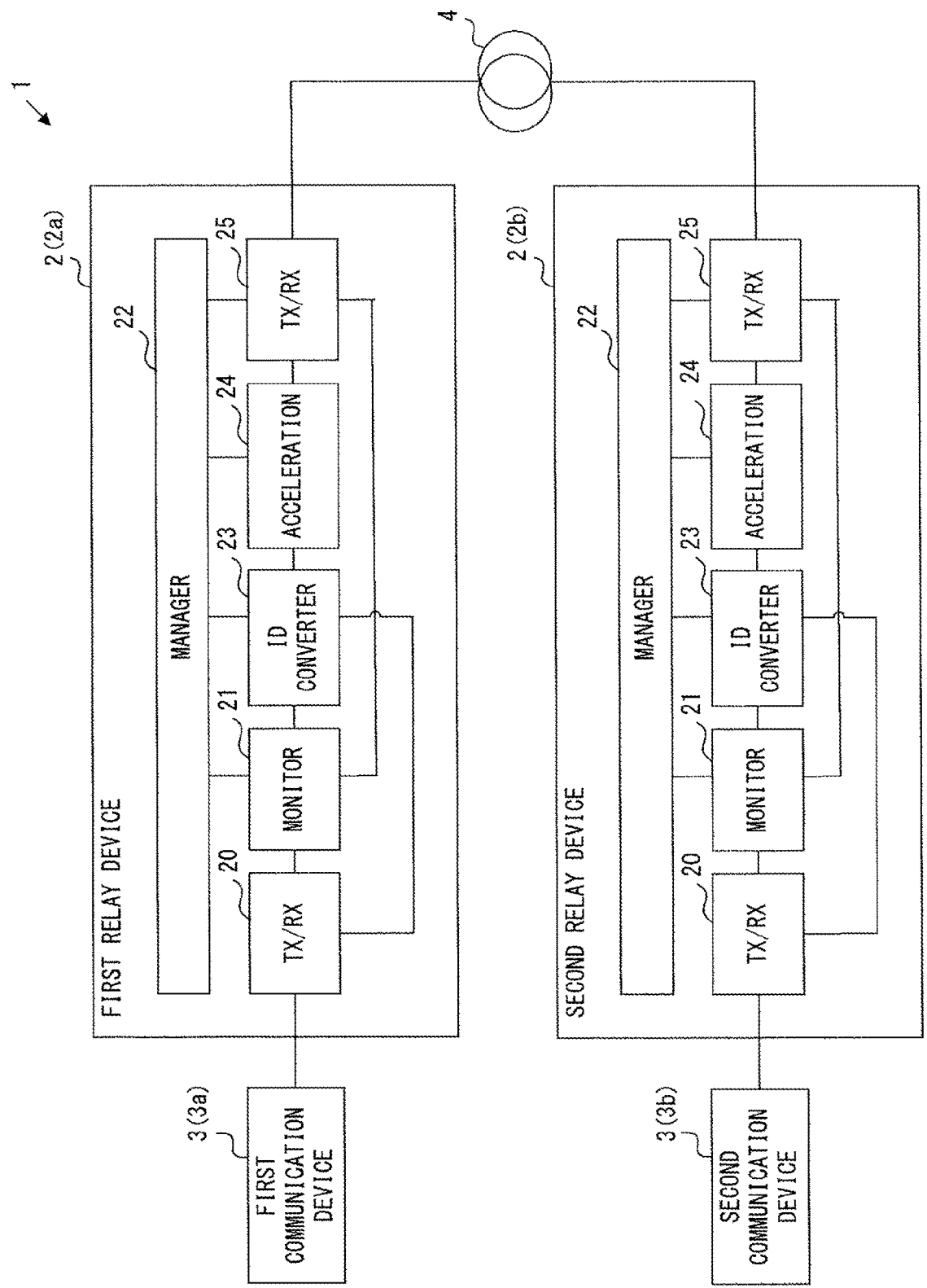
FIG. 1 illustrates an example of a configuration of a relay system and a functional block of a relay device according to embodiments.

FIG. 1 illustrates an example of a configuration of a relay system and a functional block of a relay device according to embodiments (a first embodiment) of the present invention.

A relay system 1 is an example of a communication relay system and a relay device 2 is an example of a communication relay device.

In the example of FIG. 1, the relay system 1 includes a pair of relay devices 2 (2a, 2b). One of the relay devices 2 (2a) is connected to the other relay device 2 (2b) through a network 4. The network 4 is, for example, a WAN. A communication device 3 is connected to each relay device 2. The communication device 3 (3a, 3b) is connected to a respective one of the relay devices 2 (2a, 2b) through a network such as an intranet. One of the communication devices 3 (3a) can communicate with the other communication device 3 (3b) through a pair of relay devices 2. In the following descriptions, one of the communication devices may be referred to as a first communication device, and the other communication device 3 may be referred to as a second communication device. Further, one of the relay devices may be referred to as a first relay device, and the other relay device may be referred to as a second relay device.

In this example, the relay device 2 and the communication device 3 transmit and receive a packet. However, the relay system according to the embodiments of the present invention is not limited to a configuration in which a packet is transmitted.

The relay device 2 includes a first communication processor (TX/RX) 20, a monitor unit 21, a manger 22, an ID converter 23, an accelerator 24, and a second communication processor (TX/RX) 25. The relay device 2 may include other functions or circuits not illustrated in FIG. 1.

In the following descriptions, it is assumed that communication in which data is transmitted from the first communication device 3a to the second communication device 3b is performed. In this communication, a packet transmitted from the first communication device 3a is relayed by the first relay device 2a and the second relay device 2b.

In the first relay device 2a, the first communication processor 20 receives, from the first communication device 3a, a packet to be forwarded to the second communication device 3b. Here, the first communication processor 20 receives an SYN packet (synchronize packet) from the first communication device 3a. The SYN packet is an example of a request packet that requests a connection to the other communication device 3. Further, subsequent to receiving the SYN packet, the first communication processor 20 receives one or more packets subsequent to the SYN packet from the first communication device 3, the one or more packets respectively including content data. In the following descriptions, the packet subsequent to the SYN packet may be referred to as a "subsequent packet".

The monitor unit 21 obtains a packet received by the first communication processor 20. The monitor unit 21 decides whether this packet is a target of an acceleration process.

It is assumed that decision information used to decide whether to perform an acceleration process on the received packet is determined by a user and set in the accelerator 24 in advance. In this case, the decision information is set in the monitor unit 21 by the accelerator 24 through the manger 22. However, the decision information may be generated by the manger 22. The decision information is represented by, for example, a port number. In this case, an acceleration process is performed on a packet for which a specified destination port number is set.

When the monitor unit 21 determines that a packet received from the first communication device 3a is not an acceleration target, the monitor unit 21 gives an instruction to the second communication processor 25 such that this packet is forwarded to the second communication device 3b.

When the packet received from the first communication device 3a is an SYN packet and is an acceleration target, the monitor unit 21 reports header information of the SYN packet to the manger 22. When the packet received from the first communication device 3a is an acceleration target, the monitor unit 21 instructs the ID converter 23 to convert the address set for the received packet.

In the following descriptions, the "address" is referred to as an IP address unless otherwise indicated. The IP address is an example of identification information or an identifier that identifies each communication device or each relay device uniquely. An address that identifies the first communication device 3a that transmits an SYN packet and a subsequent packet to the first relay device 2a is an example of a first identifier. An address that identifies the second communication device 3b that receives, through the second relay device 2b, a packet transmitted from the first communication device 3a is an example of a second identifier.

The manger 22 manages each function in the relay device 2. The manger 22 may perform a process of forwarding a packet to a destination communication device 3 and a process of identifying a source of the packet.

The manger 22 obtains a source address and a destination address for a packet from header information of the packet, the header information being reported by the monitor unit 21. According to the header information reported by the monitor unit 21, the manger 22 generates configuration information including the source address and the destination address for the packet. The manger 22 instructs the second communication processor 25 to transmit the generated configuration information to the second relay device 2b. Here, the configuration information may be transmitted to the second relay device 2b together with a port number that identifies a target of an acceleration process.

The manger 22 generates first correspondence information used to guide an acceleration-process target packet to the accelerator 24. The first correspondence information includes information used to convert the source address for an ACK (acknowledgement) packet that responds to the acceleration-process target packet. In the present embodiment, the ACK packet is generated by the accelerator 24. The source address for the ACK packet generated by the accelerator 24 to respond to the packet received from the first communication device 3a is the address of the first relay device 2a. The first correspondence information is used to convert the source address for the ACK packet to the address of the second communication device 3b that is a destination of an SYN packet and a subsequent packet. The conversion of these addresses are performed by the ID converter 23 described later.

In the first correspondence information, the address of the second communication device 3b, which is a destination address before a conversion for a SYN packet and a subsequent packet, is associated with the address of the first relay device 2a including the accelerator 24, which is a destination address after the conversion for the SYN packet and the subsequent packet. Further, in the first correspondence information, the address of the second communication device 3b, which is a source address after the conversion for an ACK packet, is associated with the address of the first communication device 3a, which is a source of the SYN packet and the subsequent packet and is a destination of the ACK packet. In the first correspondence information, the address of the second communication device 3b, which is a source address after the conversion for the ACK packet, may be associated with the address of the first relay device 2*a*, which is a source address before the conversion for the ACK packet. Further, in the first correspondence information, the address of the second communication device 3*b*, which is a source address after the conversion for the ACK packet, may be associated with the destination address before the conversion for the SYN packet and the subsequent packet.

In this example, the manger 22 instructs the second communication processor 25 to transmit configuration information and generates first correspondence information when the first relay device 2*a* receives an SYN packet from the first communication device 3*a*, but the embodiments of the present invention are not limited to this procedure.

The ID converter 23 obtains first correspondence information from the manger 22. According to the first correspondence information, the ID converter 23 converts each of the destination addresses of an acceleration target SYN packet and a subsequent packet to the address of the first relay device 2*a* including the accelerator 24 that performs an acceleration process on these packets. Further, the ID converter 23 converts the source address for an ACK packet to the address of the second communication device 3*b* according to the first correspondence information.

The ID converter 23 temporality stores therein first correspondence information. In this example, it is assumed that the first correspondence information is generated by the manger 22 and reported to the ID converter 23. However, the embodiments of the present invention are not limited to this method, and the first correspondence information may be generated by the ID converter 23 that has obtained configuration information from the manger 22.

The accelerator 24 performs an acceleration process, such as a data compression and a redundancy removal, on an acceleration-process target packet. This acceleration process is a known technology, so its description is omitted.

The accelerator 24 can generate an ACK packet for each of the acceleration-process target SYN packet and the subsequent packet.

The second communication processor 25 associates a specified port number with the relay device 2 (or the communication device 3) and stores therein the associated information in advance. This permits the relay device 2 to forward a packet received from the communication device 3 to an address associated with the specified port number. In this example, the accelerator 24 waits for a packet at a port with number "80". The address of the second relay device 2*b* is associated with the port with number "80". Thus, a packet that has been processed by the accelerator 24 is forwarded to the second relay device 2*b* by the second communication processor 25. Further, the second communication processor 25 can transmit configuration information to the second relay device 2*b* according to an instruction given by the manger 22.

Next, the operation of the relay device 2 when it has received a packet through the network 4 is described. It is assumed that the second relay device 2*b* receives a packet from the first relay device 2*a* through the network 4.

In the second relay device 2*b*, the second communication processor 25 processes a received packet according to the destination address for the received packet. The destination address for a packet on which an acceleration process has not been performed in the first relay device 2*a* is the address of the second communication device 3*b*. Thus, when the second communication processor 25 receives a packet on which an acceleration process has not been performed, the second communication processor 25 instructs the first communication processor 20 to transmit the packet to the communication device 3 whose address is specified as a destination address for the packet.

When the second communication processor 25 receives configuration information, the second communication processor 25 reports the configuration information to the manger 22. In the following descriptions, it is assumed that the destination address and the source address included in configuration information that the second relay device 2*b* receives from the first relay device 2*a* are the address of the second communication device 3*b* and the address of the first communication device 3*a*, respectively.

The destination address for a packet on which an acceleration process has been performed in the first relay device 2*a* is the address of the second relay device 2*b*. Thus, when the second communication processor 25 receives a packet on which an acceleration process has been performed, the second communication processor 25 forwards the packet to the accelerator 24. Then, the accelerator 24 performs an acceleration post-process that corresponds to the performed acceleration process. For example, when data is compressed by an acceleration process, the data is recovered by an acceleration post-process.

In this example, the second relay device 2*b* receives configuration information before receiving an SYN packet. However, the embodiments of the present invention are not limited to this procedure. For example, the second relay device 2*b* may receive configuration information and an SYN packet at the same time.

The manger 22 refers to configuration information received from the first relay device 2*a* and obtained through the second communication processor 25, and generates second correspondence information. The second correspondence information is used to convert the source address for a packet received from the first relay device 2*a* to the address of the first communication device 3*a*. The second correspondence information is also used to convert the destination address for an ACK packet that responds to, for example, an SYN packet received from the first communication device 3*a*.

In the second correspondence information, a port number of a packet received from the first relay device 2*a* is associated with the address of the second relay device 2*b*. Further, in the second correspondence information, the address of the first communication device 3*a*, which is a source of an SYN packet and a subsequent packet after a conversion performed by the ID converter 23 is associated with the address of the second communication device 3*b*, which is a destination of the SYN packet and the subsequent packet. Furthermore, in the second correspondence information, the address of the first communication device 3*a*, which is a destination address for an ACK packet before the conversion performed by the ID converter 23 is associated with the address of the second relay device 2*b*, which is a destination address after the conversion for the ACK packet.

In this example, it is assumed that the second correspondence information is generated by the manger 22. However, the embodiments of the present invention are not limited to this method. In other words, the second correspondence information may be generated by the ID converter 23 that has obtained configuration information from the manger 22.

The ID converter 23 obtains second correspondence information from the manger 22, and converts, according to the second correspondence information, the address for a packet received by the second relay device 2*b* through the network 4. Further, the ID converter 23 converts the destination address for an ACK packet received from the second communication device 3*b* according to the second correspondence information. The ID converter 23 holds the second correspondence information temporarily.

When an acceleration process has been performed on a packet received through the network 4, the accelerator 24 performs an acceleration post-process on the packet. The accelerator 24 instructs the ID converter 23 to convert the address set for the packet on which the acceleration post-process has been performed.

The first communication processor 20 transmits a packet according to a destination address. In this example, the first communication processor 20 transmits a packet to the second communication device 3b.

Figure 2:
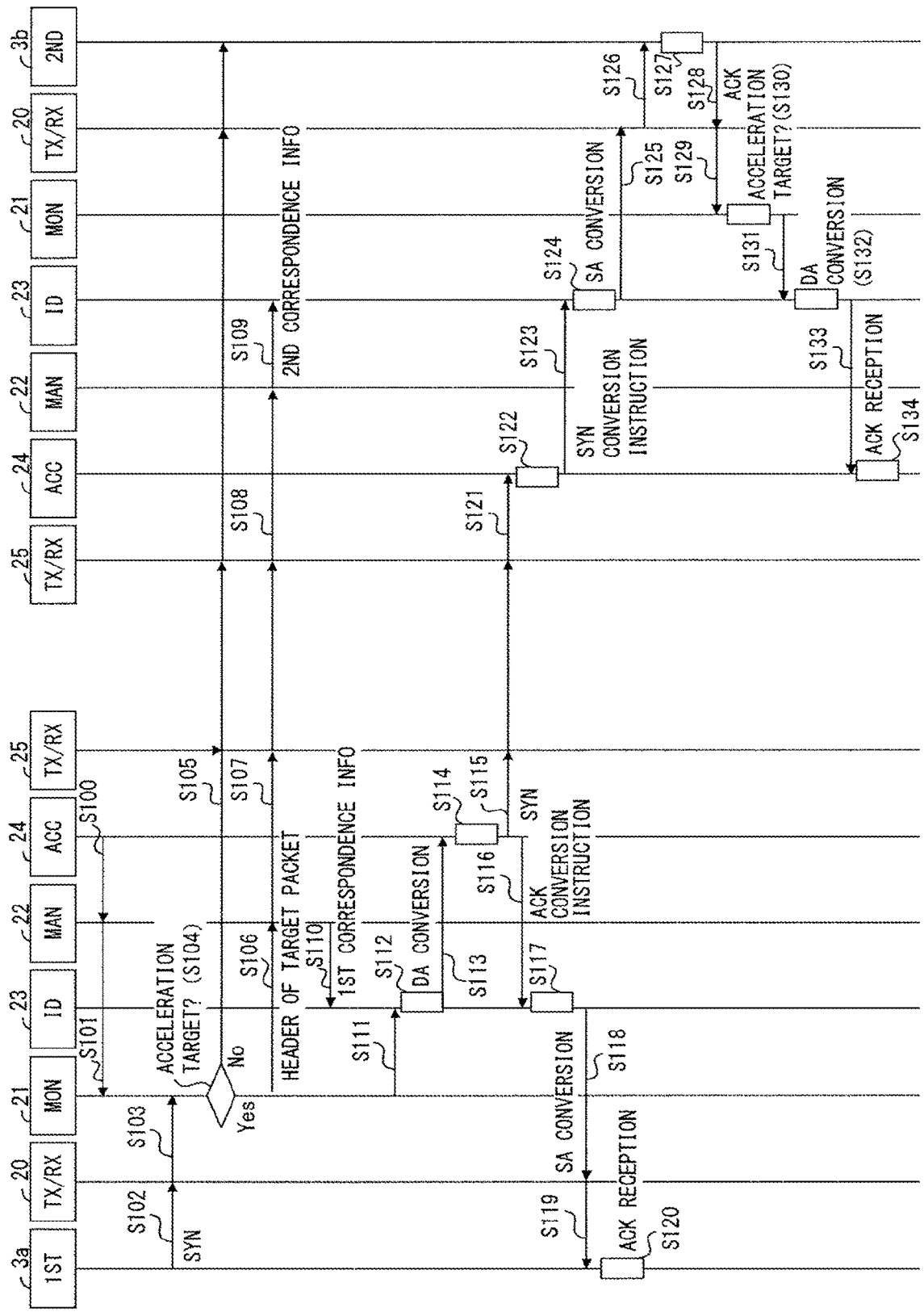
FIG. 2 illustrates an example of a sequence until a connection is established between two communication devices in the relay system according to the embodiments.

FIG. 2 illustrates an example of a sequence until a connection is established between the two communication devices in the relay system 1. An example in which the first relay device 2a and the second relay device 2b relay an SYN packet from the first communication device 3a to the second communication device 3b is described below with reference to FIG. 2, wherein the relay is performed by the first relay device 2a and the second relay device 2b in this order.

Before transmitting and receiving a packet, the accelerator 24 reports, to the manger 22, a decision criterion to decide whether a packet is an acceleration target (S100). The manger 22 reports the decision criterion to the monitor unit (S101). The decision criterion is represented by, for example, a port number.

When the first communication processor 20 of the first relay device 2a receives an SYN packet from the first communication device 3a (S102), the monitor unit 21 reads the SYN packet (S103). The monitor unit 21 decides whether a connection requested by the SYN packet is a target of an acceleration process (S104).

When the connection requested by the SYN packet is not the target of the acceleration process in Step S104, the second communication processor 25 transmits the SYN packet to the second communication device 3b (S105). In this case, the acceleration process is not performed on the SYN packet.

When the acceleration process is not performed on a packet received from the first communication device 3a in the first relay device 2a, the source address for the packet remains the address of the first communication device 3a. In this case, the second communication device 3b can identify the source of the packet. On the other hand, when the acceleration process is performed on the packet received from the first communication device 3a in the first relay device 2a, the source address for the packet is converted to the address of the first relay device 2a. In this case, it is difficult for the second communication device 3b to identify the source of the packet. Thus, when an acceleration process is performed, the processes of and after Step S106 are performed.

When it has been decided in Step S104 that the connection requested by the SYN packet is the target of the acceleration process, the monitor unit 21 reports header information of the SYN packet to the manger 22 (S106). Using the reported header information, the manger 22 generates configuration information that includes the address of the first communication device 3a, which is a source of the SYN packet, and the address of the second communication device 3b, which is a destination of the SYN packet. The manger 22 instructs the second communication processor 25 to transmit the configuration information to the second relay device 2b (S107). The second communication processor 25 transmits the configuration information to the second relay device 2b.

The second communication processor 25 of the second relay device 2b reports, to the manager 22, the configuration information received from the first relay device 2a (S108). The manager 22 generates second correspondence information according to the received configuration information. The manager 22 reports the generated second correspondence information to the ID converter 23 (S109).

In the second correspondence information, the port number of a packet received from the first relay device 2a is associated with the address of the second relay device 2b. Further, in the second correspondence information, the address of the first communication device 3a, which is a source of an SYN packet and a subsequent packet after a conversion, is associated with the address of the second communication device 3b, which is a destination of the SYN packet and the subsequent packet. Furthermore, in the second correspondence information, the address of the first communication device 3a, which is a destination address before the conversion for an ACK packet, is associated with the address of the second relay device 2b, which is a destination address after the conversion for the ACK packet.

The ID converter 23 holds the second correspondence information until processes related to a last subsequent packet and an ACK packet that responds to the last subsequent packet are completed.

The manager 22 of the first relay device 2a generates first correspondence information according to header information of an SYN packet. In the first correspondence information, the address of the second communication device 3b, which is a destination address before a conversion for the SYN packet and a subsequent packet, is associated with the address of the first relay device 2a including the accelerator 24, which is a destination address after the conversion for the SYN packet and the subsequent packet. As described above, in the first correspondence information, the address of the second communication device 3b, which is a source address after the conversion for an ACK packet, is associated with the address of the first communication device 3a, which is a destination of the ACK packet.

In the first relay device 2a, the manager 22 reports the first correspondence information to the ID converter 23 (S110). The ID converter 23 holds the first correspondence information until processes related to a last subsequent packet and an ACK packet that responds to the last subsequent packet are completed.

The process of Step S110 may be performed at the same time as one of the processes of Steps S107 to S109, or it may be performed before at least one of the processes of Steps S107 to S109.

In the first relay device 2a, the monitor unit 21 instructs the ID converter 23 to convert the address for the SYN packet obtained in Steps S102 and S103 (S111). Then, the ID converter 23 converts the destination address for the SYN packet according to the first correspondence information (S112). Specifically, the destination of the SYN packet received from the first communication device 3a is the second communication device 3b, so the ID converter 23 converts the address for the SYN packet from the address of the second communication device 3b to the address of the first relay device 2a (in this case, the address that identifies the accelerator 24).

The ID converter 23 instructs the accelerator 24 to perform an acceleration process on the SYN packet (S113). The accelerator 24 performs an acceleration process on the SYN packet according to the instruction given by the ID converter 23 in Step S103, and generates an ACK packet corresponding to the SYN packet (S114).

The accelerator 24 instructs the second communication processor 25 to transmit the SYN packet on which the acceleration process has been performed. According to this instruction, the second communication processor 25 transmits the SYN packet to the second relay device 2b according to a port number (S115).

The accelerator 24 instructs the ID converter 23 to convert the source address for the ACK packet (S116). The process of Step S116 may be performed at the same time as the process of Step S115, or it may be performed before the process of Step S115.

According to the instruction given by the accelerator 24, the ID converter 23 converts the source address for the ACK packet according to the first correspondence information (S117). Specifically, the source address for the ACK packet generated by the accelerator 24 is the address of the first relay device 2a, so the ID converter 23 converts that source address to the address of the second communication device 3b.

The ACK packet for which the source address has been converted is transmitted to the first communication device 3a by the first communication processor 25 (S118 and S119). Then, the first communication device 3a performs a process of receiving the ACK packet (S120). Here, according to the source address for the ACK packet, the first communication device 3a determines that the SYN packet has been received by the second communication device 3b.

In the second relay device 2b, the second communication processor 25 receives the SYN packet transmitted from the first relay device 2a. The second communication processor 25 decides whether an acceleration process has been performed on the SYN packet. It is assumed that an acceleration process has been performed on the SYN packet. In this case, the second communication processor 25 instructs the accelerator 24 to perform an acceleration post-process (S121). The process of Step S121 may be performed at the same time as one of Steps S116 to S120, or it may be performed before at least one of these processes.

In response to the instruction given by the second communication processor 25 in Step S121, the accelerator 24 performs an acceleration post-process on the SYN packet (S122). Then, the accelerator 24 instructs the ID converter 23 to convert the address set for the SYN packet on which the acceleration post-process has been performed (S123).

The ID converter 23 converts the source address for the SYN packet according to the second correspondence information (S124). In this example, the source address for the SYN packet on which the acceleration post-process has been performed is the address of the second relay device 2b. Thus, the ID converter 23 converts the source address for the SYN packet to the address of the first communication device 3a according to, for example, a port number.

The ID converter 23 instructs the first communication processor 20 to transmit, to the second communication device 3b, the SYN packet for which the address has been converted (S125). The first communication processor 20 forwards the SYN packet to the second communication device 3b (S126).

The second communication device 3b receives the SYN packet (S127). Here, the source address for the SYN packet has been converted to the address of the first communication device 3a by the ID converter 23 in the second relay device 2b. Thus, the second communication device 3b decides that the source of the SYN packet is the first communication device 3a.

In response to the SYN packet, the second communication device 3b transmits an ACK packet whose destination is the first communication device 3a (S128). The first communication processor 20 of the second relay device 2b guides the ACK packet received from the second communication device 3b to the monitor unit 21 (S129).

The monitor unit 21 decides whether the ACK packet obtained from the first communication processor 20 is an acceleration target (S130). It is assumed that this ACK packet is an acceleration target ACK packet. In this case, the monitor unit 21 instructs the ID converter 23 to convert the address set for the ACK packet (S131).

The ID converter 23 converts the address set for the ACK packet according to the second correspondence information (S132). In this example, the destination address for the ACK packet received from the second communication device 3b is the address of the first communication device 3a, so the ID converter 23 converts the destination address for the ACK packet from the address of the first communication device 3a to the address of the second communication device 3b. As a result, the ACK packet is guided to the accelerator 24 of the second relay device 2b (S133). The accelerator 24 performs a process of receiving the ACK packet (S134).

As described above, the first relay device 2a generates first correspondence information according to the header information of an SYN packet that requests a connection from the first communication device 3a to the second communication device 3b. The second relay device 2b receives configuration information, that is generated using the header information of the SYN packet in the first relay device 2a, and generates second correspondence information according to the configuration information. The source address and the destination address for an acceleration-process target packet are converted according to the first correspondence information and the second correspondence information. Thus, in the relay system 1 in which an acceleration process is performed by the relay device 2 (2a, 2b), the communication device 3 can recognize the source of a received packet. Further, the relay device 2 can forward the packet to an appropriate communication device 3.

Figure 3:
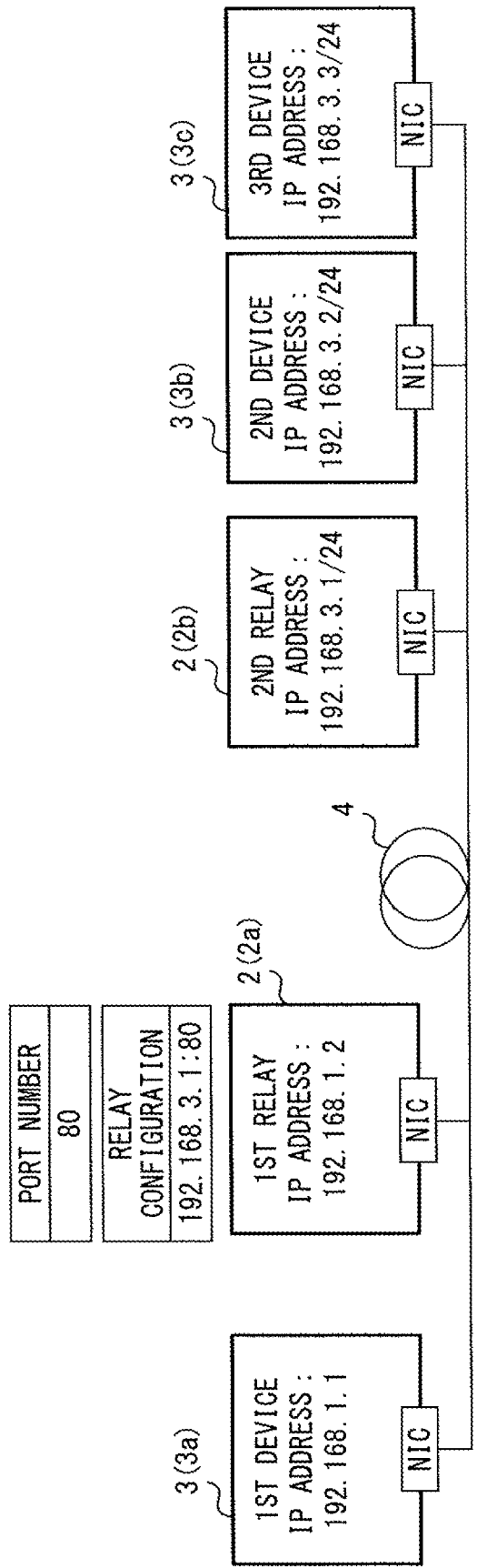
FIG. 3 illustrates an example of settings of addresses in the relay system according to the embodiments.

FIG. 3 illustrates an example of settings of addresses in the relay system 1 according to the present embodiment. In this example, in addition to the first communication device 3a, the first relay device 2a, the second relay device 2b, and the second communication device 3b that are illustrated in FIG. 1, a third communication device 3c is implemented. In the following descriptions, an example in which a communication device 3 that receives a packet can recognize the source of the packet due to the sequence illustrated in FIG. 2 being performed is described.

In this example, it is assumed that IP addresses "192.168.3.2" and "192.168.3.3" are assigned to an FQDN "xyz.com", as illustrated in FIG. 3.

In this example, the IP addresses of the first communication device 3a, the second communication device 3b, and the third communication device 3c are "192.168.1.1", "192.168.3.2", and "192.168.3.3", respectively. Further, the IP addresses of the first relay device 2a and the second relay device 2b are "192.168.1.2" and "192.168.3.1", respectively.

Moreover, in this example, it is assumed that an initial setting below is performed in advance in the first relay device 2a.

(1) The accelerator 24 waits for a packet at a port with number 80.

(2) A packet on which an acceleration process has been performed is guided to the second relay device 2b "192.168.3.1:80".

Figure 4:
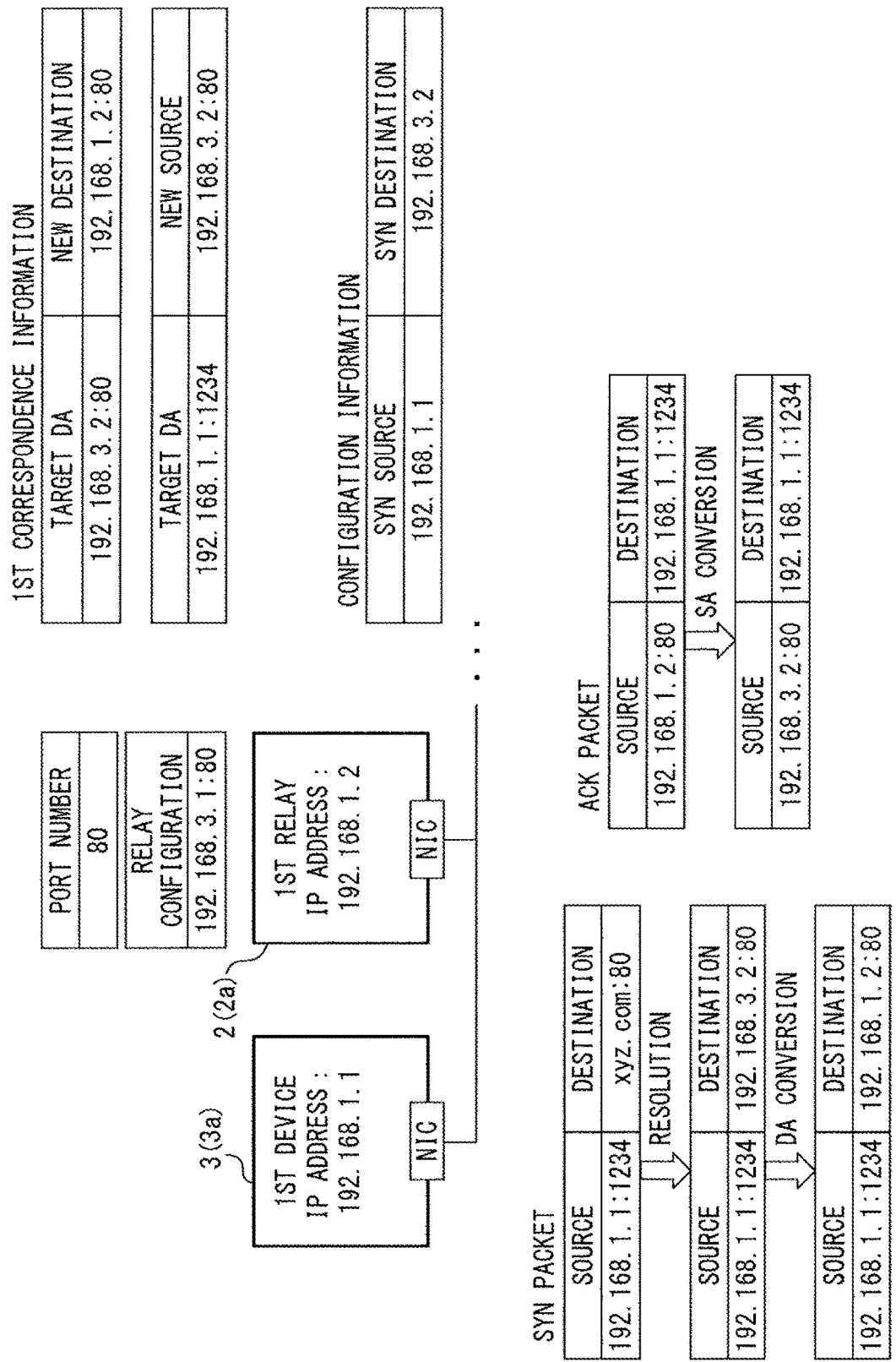
FIG. 4 illustrates an example of a method for setting an address in a first relay device.

FIG. 4 illustrates an example of a method for setting an address in the first relay device 2a.

The destination FQDN of an SYN packet whose source is the first communication device 3a is "xyz.com". The IP address corresponding to the FQDN is resolved by a DNS (domain name system) server (not illustrated). In this example, the IP address corresponding to "xyz.com" is "192.168.3.2".

The accelerator 24 implemented in the first relay device 2a waits for a packet having a destination port with number 80. The IP address of the second relay device 2b "192.168.3.1" is set in advance as a forwarding destination of a packet on which an acceleration process has been performed.

The first relay device 2a generates configuration information in which the source IP address "192.168.1.1" and the destination IP address "192.168.3.2" are associated with each other with respect to the SYN packet, and transmits the configuration information to the second relay device 2b.

The first correspondence information illustrated in FIG. 4 indicates two correspondence relationships described below.
(1) A correspondence relationship used to convert the destination address for a received packet to "192.168.1.2:80" when the destination address for the received packet is "192.168.3.2:80".
(2) A correspondence relationship used to convert the source address for a received packet to "192.168.3.2:80" when the destination address for the received packet is "192.168.1.1: 1234".

When the first correspondence information described above is set in the first relay device 2a, the destination address "192.168.3.2" for the SYN packet illustrated in FIG. 4 is converted into "192.168.1.2" by the ID converter 23. Further, the source address "192.168.1.2" for an ACK packet illustrated in FIG. 4 is converted into "192.168.3.2" by the ID converter 23.

Figure 5:
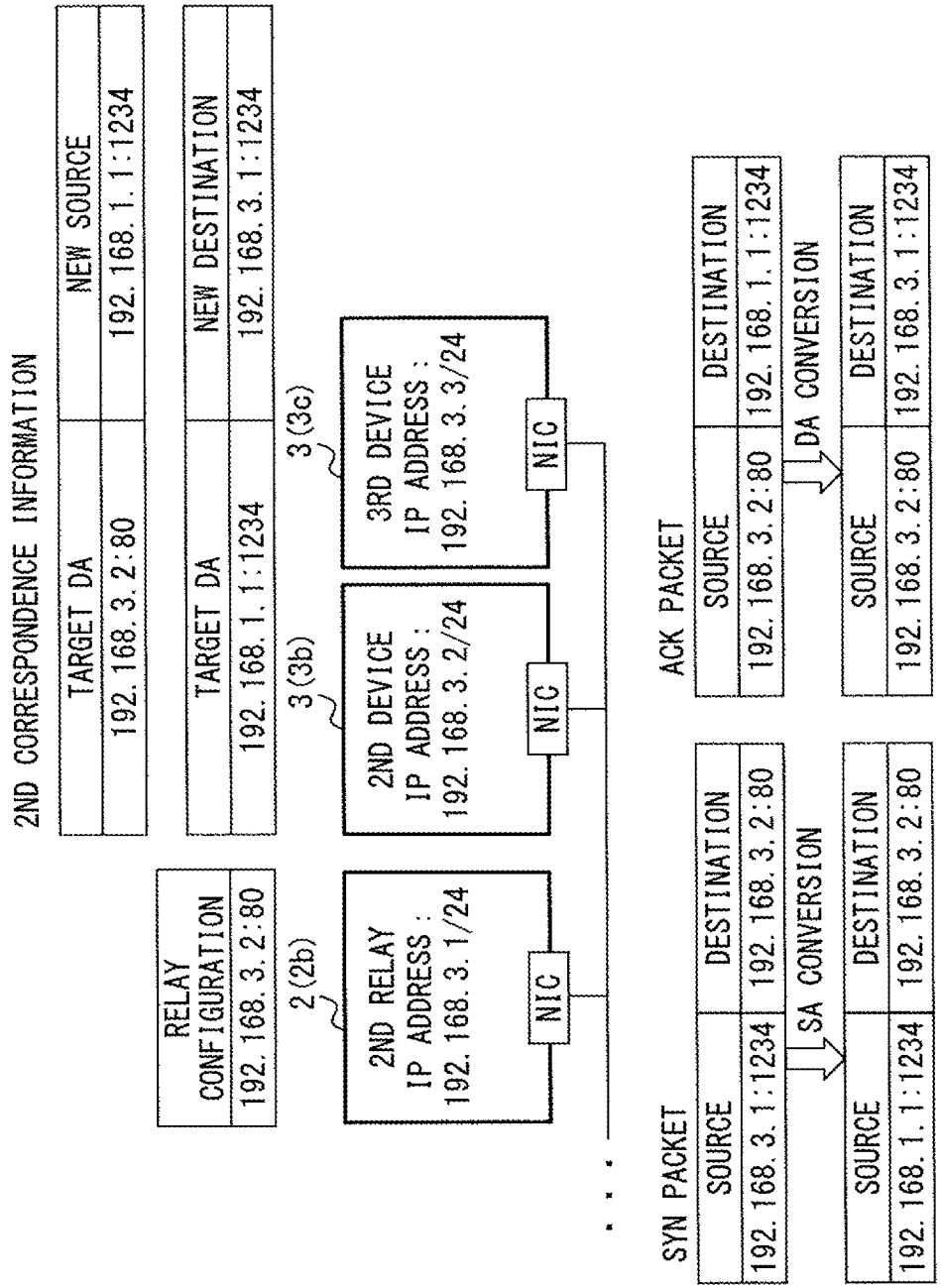
FIG. 5 illustrates an example of a method for setting an address in a second relay device.

FIG. 5 illustrates an example of a method for setting an address in the second relay device 2b.

According to configuration information received from the first relay device 2a, the second relay device 2b sets a forwarding destination address for a packet received from the first relay device 2a. In this example, "192.168.3.2" is set in association with a port number 80. In this case, the second relay device 2b forwards a packet having a destination port number 80 to the address "192.168.3.2". Further, the second relay device 2b generates second correspondence information according to the configuration information received from the first relay device 2a.

The second correspondence information illustrated in FIG. 5 indicates two correspondence relationships described below.
(1) A correspondence relationship used to convert the source address for a received packet to "192.168.1.1:1234" when the destination address for the received packet is "192.168.3.2:80".
(2) A correspondence relationship used to convert the destination address for a received packet to "192.168.3.1:1234" when the destination address for the received packet is "192.168.1.1:1234".

When the second correspondence information described above is set in the second relay device 2b, the source address "192.168.3.1" of the SYN packet illustrated in FIG. 5 is converted into "192.168.1.1" by the ID converter 23. Further, the destination address "192.168.1.1" of the ACK packet illustrated in FIG. 5 is converted into "192.168.3.1" by the ID converter 23.

As described above, the first relay device 2a and the second relay device 2b respectively generate first correspondence information and second correspondence information based on an SYN packet. Then, the first relay device 2a converts the source address and the destination address of the packet according to the first correspondence information, and the second relay device 2b converts the source address and the destination address of the packet according to the second correspondence information. The first correspondence information and the second correspondence information are held until each of the processes performed on a last subsequent packet and an ACK packet that responds to the last subsequent packet is completed.

Figure 6:
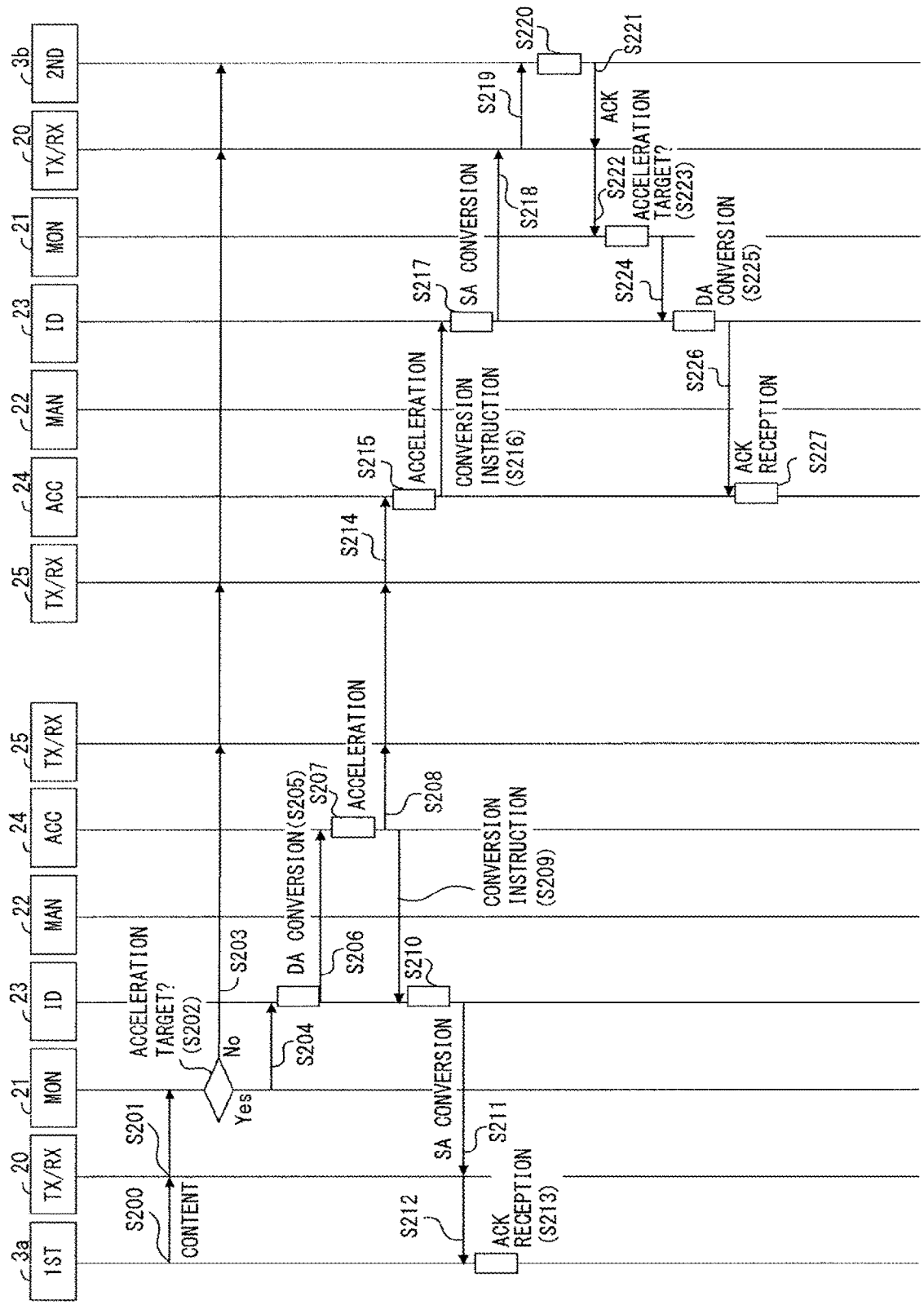
FIG. 6 illustrates an example of a sequence after a connection is established between the two communication devices in the relay system according to the embodiments.

FIG. 6 illustrates an example of a sequence after a connection is established between the two communication devices in the relay system 1 according to the present embodiment.

In FIG. 6, "CONTENT" may also be used as a subsequent packet. Further, it is assumed that a subsequent packet is transmitted from the first communication device 3a to the second communication device 3b after a connection is established between the first communication device 3a and the second communication device 3b by the procedure described with reference to FIG. 2. The address of the first communication device 3a and the address of the second communication device 3b are set for each subsequent packet transmitted from the first communication device 3a to the second communication device 3b as a source of the subsequent packet and a destination of the subsequent packet, respectively.

When the first communication processor 20 of the first relay device 2a receives a subsequent packet from the first communication device 3a (S200), the monitor unit 21 reads the subsequent packet (S201) and decides whether the subsequent packet is an acceleration target (S202). For example, it is decided whether a received packet is an acceleration-process target according to a port number of the packet.

When the monitor unit 21 has decided that the subsequent packet is not an acceleration target, the monitor unit 21 instructs the second communication processor 25 to transmit the subsequent packet to the second communication device 3b (S203). In this case, an acceleration process is not performed on the subsequent packet.

When it has been decided that the subsequent packet is an acceleration target, the monitor unit 21 instructs the ID converter 23 to convert the address set for the subsequent packet (S204).

The ID converter 23 converts the destination address for the subsequent packet from the address of the second communication device 3b to the address of the first relay device 2a according to first correspondence information (S205). In this example, the destination address for the subsequent packet is the address of the second communication device 3b, so the ID converter 23 converts the destination address to the address of the first relay device 2a so that the destination of the subsequent packet is the accelerator 24 of the first relay device 2a. As a result, the subsequent packet is guided to the accelerator 24 (S206).

In response to the instruction given by the ID converter 23, the accelerator 24 performs an acceleration process on the subsequent packet. Further, the accelerator 24 generates an ACK packet corresponding to the subsequent packet (S207).

The accelerator 24 instructs the second communication processor 25 to transmit the subsequent packet on which the acceleration process has been performed. According to this instruction, the second communication processor 25 transmits the subsequent packet to the second relay device 2b (S208).

The accelerator 24 instructs the ID converter 23 to convert the source address for the ACK packet (S209). The process of Step S209 may be performed at the same time as the process of Step S208 or it may be performed before the process of Step S208.

Following the instruction given by the accelerator 24, the ID converter 23 converts the source address for the ACK packet according to the first correspondence information (S210). In this example, the destination address for the ACK packet represents the first communication device 3a, so the ID converter 23 converts the source address for the ACK packet to the address of the second communication device 3b.

The ID converter 23 instructs the first communication processor 20 to transmit the ACK packet to the first communication device 3a (S211).

The first communication processor 20 transmits the ACK packet to the first communication device 3a (S212). The first communication device 3a performs a process of receiving the ACK packet (S213). Here, the source address for the ACK packet has been converted to the second communication device 3b by the ID converter 23. Thus, the first communication device 3a decides that the ACK packet has been received from the second communication device 3b, which is a destination of the subsequent packet.

The second communication processor 25 of the second relay device 2b receives the subsequent packet transmitted in Step S208. The second communication processor 25 determines that an acceleration process has been performed on the subsequent packet and instructs the accelerator 24 to perform an acceleration post-process (S214). This process of Step S214 may be performed at the same time as one of the processes of Steps S209 to S212, or it may be performed before at least one of these processes.

Following the instruction given by the second communication processor 25 in Step S214, the accelerator 24 performs an acceleration post-process of the subsequent packet (S215). The accelerator 24 instructs the ID converter 23 to convert the address set for the subsequent packet on which the acceleration post-process has been performed (S216).

The ID converter 23 converts the source address for the subsequent packet according to second correspondence information (S217). In this example, the source address for the subsequent packet on which the acceleration post-process has been performed represents the second relay device 2b. Then, the ID converter 23 converts the source address for the subsequent packet to the address of the first communication device 3a according to the second correspondence information.

The ID converter 23 instructs the first communication processor 20 to transmit the subsequent packet after the address conversion to the second communication device 3b (S218).

The first communication processor 20 forwards the subsequent packet to the second communication device 3b (S219). The second communication device 3b performs a process of receiving the subsequent packet (S220). Here, the source address for the subsequent packet has been converted to the first communication device 3a by the ID converter 23. Thus, the second communication device 3b decides that the source of the subsequent packet is the first communication device 3a. Then, the second communication device 3b transmits an ACK packet whose destination is the first communication device 3a (S221).

The first communication processor 20 of the second relay device 2b receives the ACK packet from the second communication device 3b and guides the ACK packet to the monitor unit 21 (S222).

The monitor unit 21 decides whether the ACK packet obtained from the first communication processor 20 is an acceleration target (S223). This ACK packet is an acceleration target, so the monitor unit 21 instructs the ID converter 23 to convert the address set for the ACK packet (S224).

Following the instruction given by the monitor unit 21, the ID converter 23 converts the address set for the ACK packet (S225). In this example, the destination address for the ACK packet represents the first communication device 3a, so the ID converter 23 converts the destination address for the ACK packet to the address of the second communication device 3b. As a result, the ACK packet is guided to the accelerator (S226). Then, the accelerator 24 performs a process of receiving the ACK packet (S227).

Figure 7:
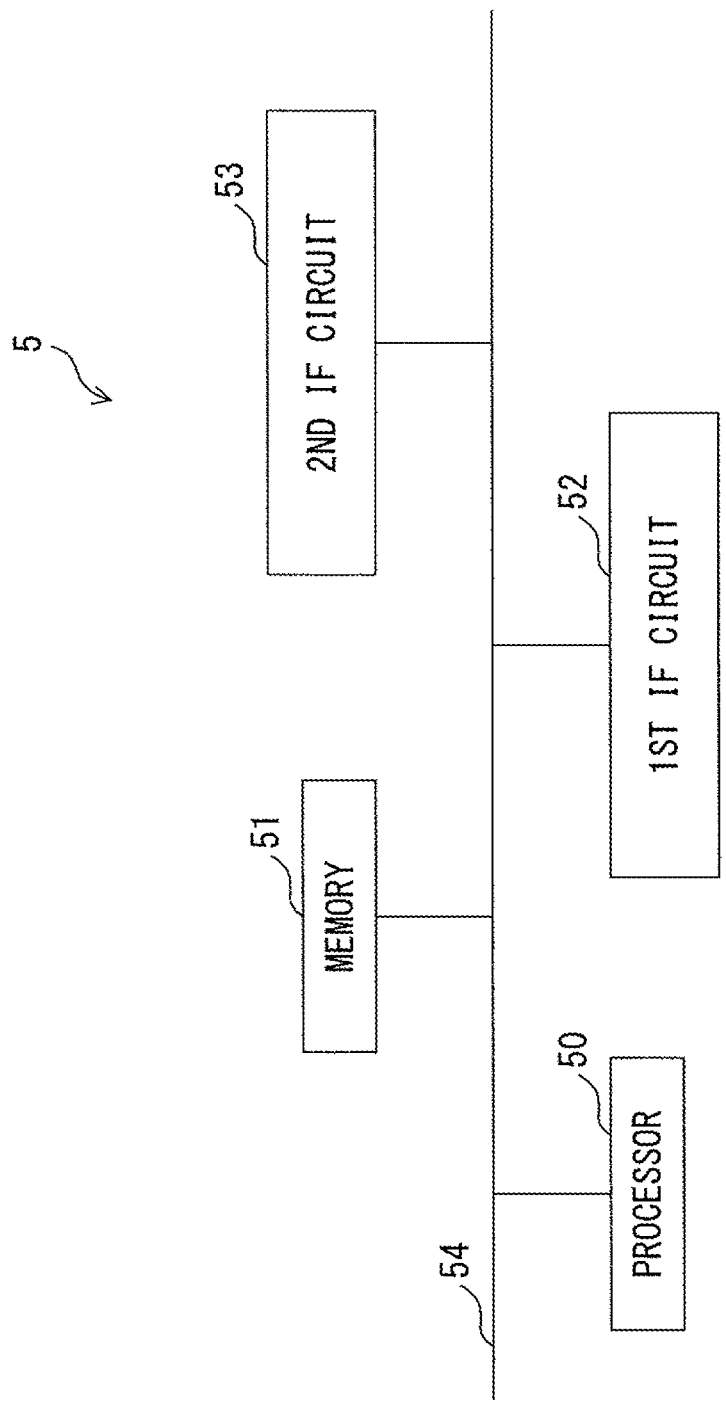
FIG. 7 illustrates an example of a hardware configuration of the relay device according to the embodiments.

FIG. 7 illustrates an example of a hardware configuration of the relay device 2 according to the present embodiment. The relay device 2 includes hardware that may be a general-purpose computer, and a process performed by the relay device 2 is performed using hardware 5 described below.

The hardware 5 includes, for example, a processor 50, a memory 51, a first communication interface circuit 52, and a second communication interface circuit 53 that are connected to one another through a bus 54.

For example, the processor 50 is a single-core, dual-core, or multi-core processor.

The memory 51 is, for example, a ROM (read only memory), a RAM (random access memory), a semiconductor memory, or a combination thereof.

The functions of the monitor unit 21, the manager 22, the ID converter 23, and the accelerator 24 are provided by the processor 50 executing a program (including a communication relay control program) stored in the memory 51.

The first communication interface circuit 52 and the second communication interface circuit 53 are used when the relay device 2 transmits/receives information to/from the other relay device 2 or the communication device 3 through the Internet, an intranet, or a dedicated line. The functions of the first communication processor 20 and the second communication processor 25 are provided by the processor 50 performing a process using information stored in the memory 51 and performing a communication using the first and second communication interface circuits 52 and 53. NICs illustrated in FIGS. 3-5 are an example of a combination of the first communication interface circuit 52 and the second communication interface circuit 53.

As an example other than the cases described above, all of or a portion of the functions in the functional block of the relay device 2 illustrated in FIG. 1 may be implemented by dedicated hardware as needed.

FIGS. 8A and 8B illustrate an example of a conventional address conversion and an example of an address conversion according to the embodiments of the present invention. Each of servers A and B in FIGS. 8A and 8B is an example of the communication device 3. Each of proxy servers P and Q is an example of a conventional relay device. Each of proxy servers S and T is an example of the relay device 2 according to the present embodiment. "PROXY" in FIGS. 8A and 8B is referred to as a proxy server.

FIG. 8A illustrates an example of an address conversion using a conventional relay device. In this case, not the server B, which is a final destination of the packet, but the proxy server P, which is the first server to relay the packet, is to be set in the server A as a source of the packet. The proxy server Q, which is a next forwarding destination of the packet, is to be set, as a destination of the packet, in the proxy server P, which is the first server to receive the packet from the server A.

Here, the source address for a packet transmitted from the proxy server P is replaced by the address of the proxy server P. When the proxy server Q receives the packet from the proxy server P, the proxy server Q transmits the packet to the server B. Here, the source address for the packet transmitted from the proxy server Q is replaced by the address of the proxy server Q. As a result, the server B becomes unable to identify the source server of the received packet.

When the relay device 2 according to the present embodiment is used, the server A transmits a packet whose destination is the server B and the proxy servers S and T replay the packet, as illustrated in FIG. 8B.

In the proxy server S, the address of the proxy server T is associated with a port number and set to be a next forwarding destination of the packet in advance, the port number being used to receive the packet from the server A. Thus, in the server A, there is no need to set the proxy server S, not the server B, to be a destination of a packet to be transmitted, as in the case of the conventional technology described above. The determination of whether to perform an acceleration process is performed in the proxy server S, and a packet is automatically guided to the accelerator 24 due to a result of the determination.

The proxy server S receives a packet (an SYN packet) related to a request made by the server A to establish a connection, obtains a source address and a destination address from header information of the packet, and generates configuration information including the source address and the destination address. Before the proxy server S forwards the packet, the proxy server S reports the configuration information to the proxy server T, which is a next forwarding destination of the packet from the server A. The proxy server S receives the SYN packet and a subsequent packet from the serer A, and forwards these packets to the proxy server T.

In this case, there is no need to perform a setting for forwarding the packet from the proxy server S to the proxy server T. The reason is that, in the proxy server S, the address of the proxy server T has been associated with a port number of the packet from the server A and set to be a next destination of the packet, as described above.

The proxy server T performs an acceleration post-process on the received packet. Here, the source address for the packet is converted to the address of the proxy server T. Next, the proxy server T converts the source address for the packet to the address of the server A, which is an original source of the packet, according to second correspondence information. Then, the proxy server T transmits the packet to the server B. Information indicating the destination of the packet is set in the proxy server T according to the configuration information reported by the proxy server S, as described above.

In the server B, the source address for the packet represents the server A due to the source address having been converted by the proxy server T. Accordingly, the server B can identify the source of the packet.

As described above, by using the relay device 2 according to the present embodiment, a communication device that receives data can identify the source of the data and perform a high-speed communication using a simple configuration.

Second Embodiment

A second embodiment of the present invention is based on the embodiments illustrated in FIGS. 1-6. Thus, a setting for converting an address according to the embodiments illustrated in FIGS. 1-6 is simply described before the second embodiment is described.

Figure 9:
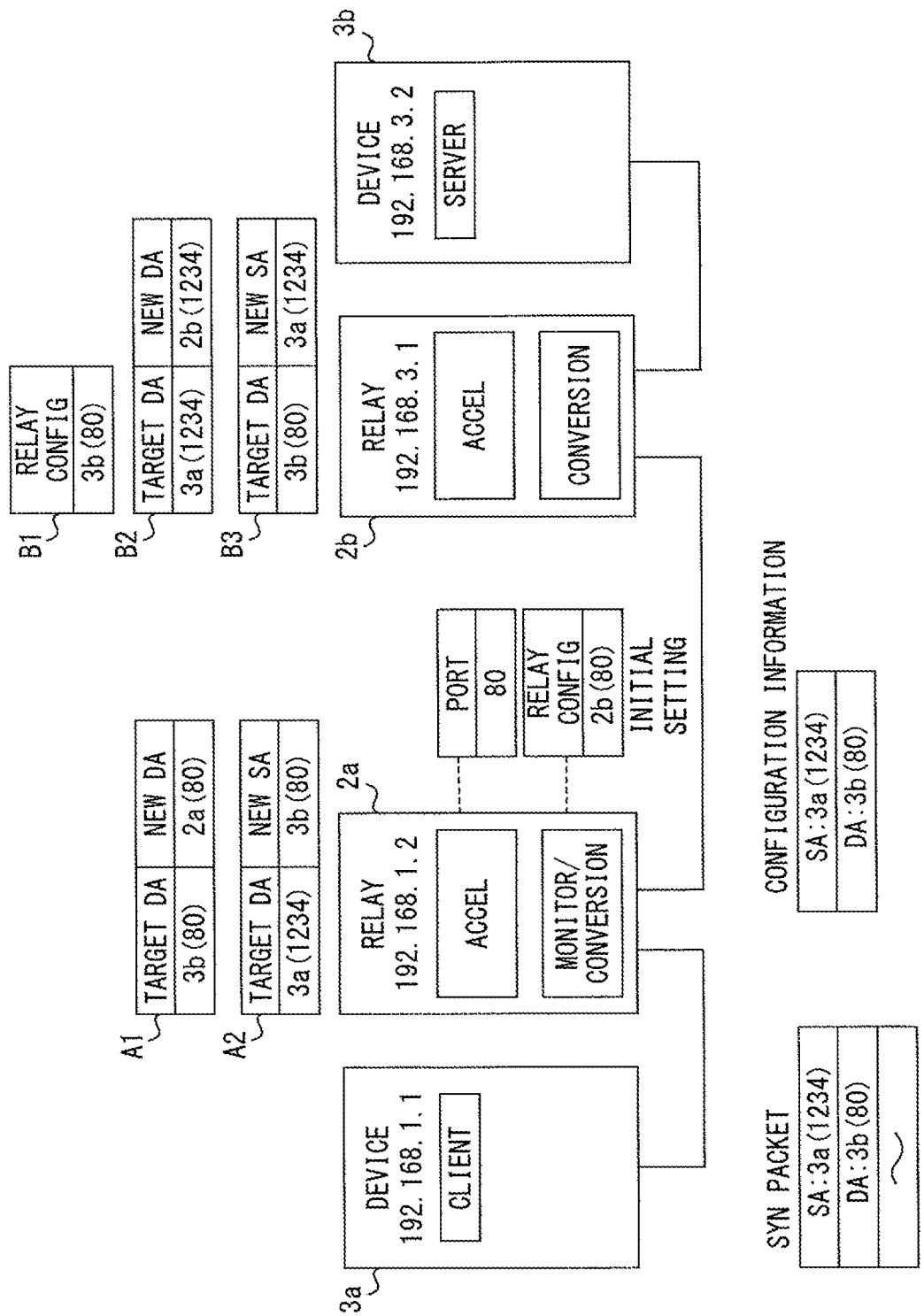
FIG. 9 illustrates an outline of a setting for converting an address.

FIG. 9 illustrates an outline of the setting for converting an address. In this example, the communication device 3a is connected to the relay device 2a, and the communication device 3b is connected to the relay device 2b. For example, the relay devices 2a and 2b are connected to each other through a WAN. It is assumed that data is transmitted from a client implemented in the communication device 3a to a server implemented in the communication device 3b. Here, the relay devices 2a and 2b perform an acceleration process.

An initial setting below is made in the relay device 2a.
(1) Perform an acceleration process on a packet with a port number 80
(2) Forward the packet on which the acceleration process has been performed to the relay device 2b
This initial setting is performed by, for example, a user.

The communication device 3a generates an SYN packet that requests a connection between the communication device 3a and the communication device 3b. Header information of the SYN packet includes source information and destination information. The source information indicates the communication device 3a (port number is 1234) and the destination information indicates the communication device 3b (port number is 80). This SYN packet is received by the relay device 2a.

The relay device 2a extracts the source information and the destination information described above from the header of the received SYN packet. The source information and the destination information extracted from the header of the SYN packet are used to generate correspondence information in the relay devices 2a and 2b.

The relay device 2a generates correspondence information A1 and A2 below according to the configuration information.
Correspondence information A1: when a packet whose destination is the communication device 3b is received, the destination of the packet is converted to the relay device 2a.
Correspondence information A2: when a packet whose destination is the communication device 3a is received, the source of the packet is converted to the communication device 3b.

"TARGET DA" (a target destination) in FIG. 9 indicates a condition for extracting a packet for which an address is to be converted. "NEW DESTINATION (NEW DA)" indicates a destination address after the conversion, and "NEW SOURCE (NEW SA)" indicates a source address after the conversion.

The target destination of the correspondence information A1 can be obtained from the destination information of the SYN packet. The new destination of the correspondence information A1 indicates the address of the relay device 2a itself. The target destination of the correspondence information A2 can be obtained from the source information of the SYN packet. The new source of the correspondence information A2 can be obtained from the destination information of the SYN packet.

The relay device 2b generates relay information B1 as well as correspondence information B2 and B3 below according to configuration information.
Relay information B1: a packet on which an acceleration post-process has been performed is forwarded to the communication device 3b.
Correspondence information B2: when a packet whose destination is the communication device 3a is received, the destination of the packet is converted to the relay device 2b.

Correspondence information B3: when a packet whose destination is the communication device 3b, the source of the packet is converted to the communication device 3a.

The relay information B1 can be obtained from the destination information of the SYN packet. The target destination of the correspondence information B2 can be obtained from the source information of the SYN packet. The new destination of the correspondence information B2 indicates the address of the relay device 2b itself. The target destination of the correspondence information B3 can be obtained from the destination information of the SYN packet. The new source of the correspondence information B3 can be obtained from the source information of the SYN packet.

Figure 10:
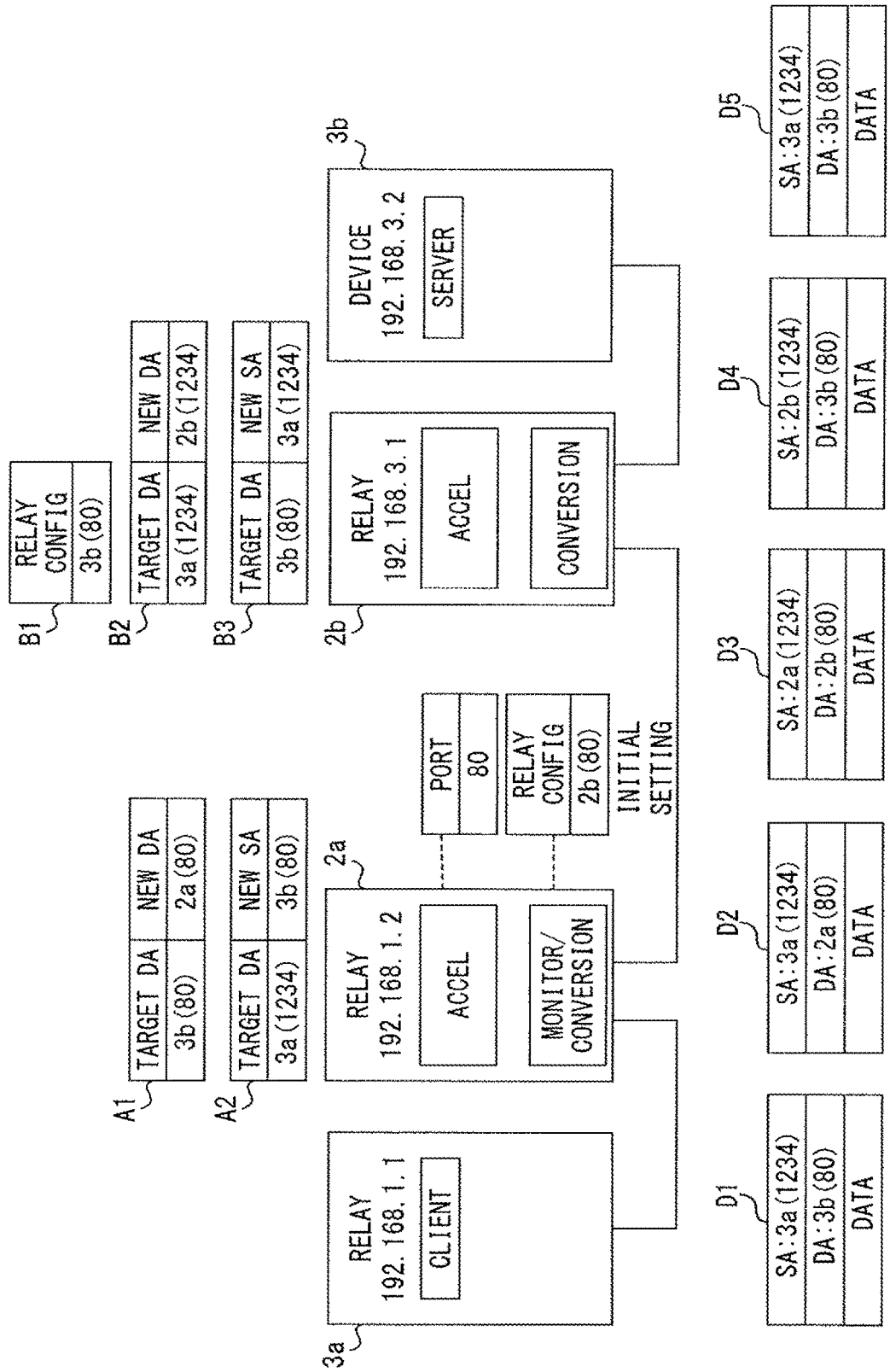
FIG. 10 illustrates an example of forwarding a packet after correspondence information is generated by the procedure illustrated in FIG. 9.

FIG. 10 illustrates an example of forwarding a packet after correspondence information is generated by the procedure illustrated in FIG. 9. In this example, a data packet is transmitted from the communication device 3a to the communication device 3b. In this example, the source information and the destination information of a data packet D1 transmitted from the communication device 3a is "3a (1234)" and "3b(80)", respectively. The figures in parentheses each indicate a port number. This data packet is received by the relay device 2a.

In the relay device 2a, the destination information of the data packet D1 received from the communication device 3a matches the target destination of the correspondence information A1. In this case, the relay device 2a converts the destination information of the data packet D1 from "3b(80)" to "2a(80)". This address conversion results in generating a data packet D2. The destination information of the data packet D2 indicates an accelerator of the relay device 2a. Thus, the relay device 2a performs an acceleration process on the data packet D2 using the accelerator, so as to generate a data packet D3. The source information of the data packet D3 output from the accelerator indicates the relay device 2a. In addition, "2b(80)" is set to be the destination information of the data packet D3 in accordance with the initial setting. As a result, the data packet D3 is transmitted from the relay device 2a to the relay device 2b.

In the relay device 2b, the destination information of the received data packet D3 indicates the relay device 2b. Thus, the relay device 2b performs an acceleration post-process on the data packet D3 using an accelerator, so as to generate a data packet D4. The source information of the data packet D4 output from the accelerator indicates the relay device 2b. In addition, "3b(80)" is set to be the destination information of the data packet D4 in accordance with the relay information B1.

Further, the destination information of the data packet D4 matches the target destination of the correspondence information B3. In this case, the relay device 2b converts the source information of the data packet D4 from "2b(1234)" to "3a(1234)" according to the correspondence information B3. This address conversion results in generating a data packet D5. After that, the data packet D5 is transmitted to the communication device 3a in accordance with the destination information.

The communication device 3a receives the data packet D5 from the communication device 3b. Here, the source information of the data packet D5 has been converted to "3a (1234)" in the relay device 2b. Thus, the communication device 3a decides that the source of the received data packet is the communication device 3a.

The accelerator illustrated in FIGS. 9 and 10 corresponds to the accelerator 24 illustrated in FIG. 1. The "monitor/conversion" illustrated in FIGS. 9 and 10 corresponds to the monitor unit 21 and the ID converter 23 illustrated in FIG. 1. The "conversion" illustrated in FIGS. 9 and 10 corresponds to the ID converter 23 illustrated in FIG. 1.

In the second embodiment, in a communication system illustrated in FIGS. 9 and 10, data is transmitted using an application whose port number is dynamically determined. For example, a TCP port number may be dynamically determined in the FTP (file transfer protocol) widely used as a file transfer protocol.

FIG. 11 illustrates an example of an FTP session. A control connection and a data connection are established when the FTP is used. Further, a port with number 20 and a port with number 21 are generally used in the FTP. Thus, in this example, it is assumed that a server establishes the control connection using the port with number 20 and establishes the data connection using the port with number 21. It is assumed that the port of a client is dynamically assigned from among unused ports. In the example illustrated in FIG. 11, a port with number 3001 is assigned to the control connection, and a port with number 3002 is assigned to the data connection.

First, an authentication procedure is performed between the client and the server in the FTP. For example, the client transmits a connection start command to the server. When the server accepts the connection start command, the server transmits a service ready message to the client. The client transmits a user name to the server. When the server accepts the user name, the server requests a password of the client. The client transmits the password to the server. When the received password corresponds to the user name, the server permits a login.

Next, a connection preparation procedure is performed between the client and the server. For example, the client transmits a TYPE command to the server. When the server accepts the TYPE command, the server transmits a type set message to the client. The client transmits a port command (PORT) to the server. The port command is used to report, to the server, a port number assigned to a data connection. Thus, in the example illustrated in FIG. 11, the port command includes "port number: 3002". When the server accepts the port command, the server transmits a PORT command OK message to the client.

The server recognizes the port number of the client through the connection preparation procedure described above. Thus, in a subsequent data transfer procedure, the server transmits data to the client using a reported port number. For example, in the example illustrated in FIG. 11, the server transmits "data connection (CONNECTION START)" and "directory list send" to using port number 3002.

However, it is difficult to apply the acceleration described in FIGS. 1-6 to an application whose port number is dynamically determined. For example, in the FTP session illustrated in FIG. 11, it is difficult to apply the acceleration illustrated in FIGS. 9 and 10 to a data connection which permits a data transmission from a server to a client.

Figure 12:
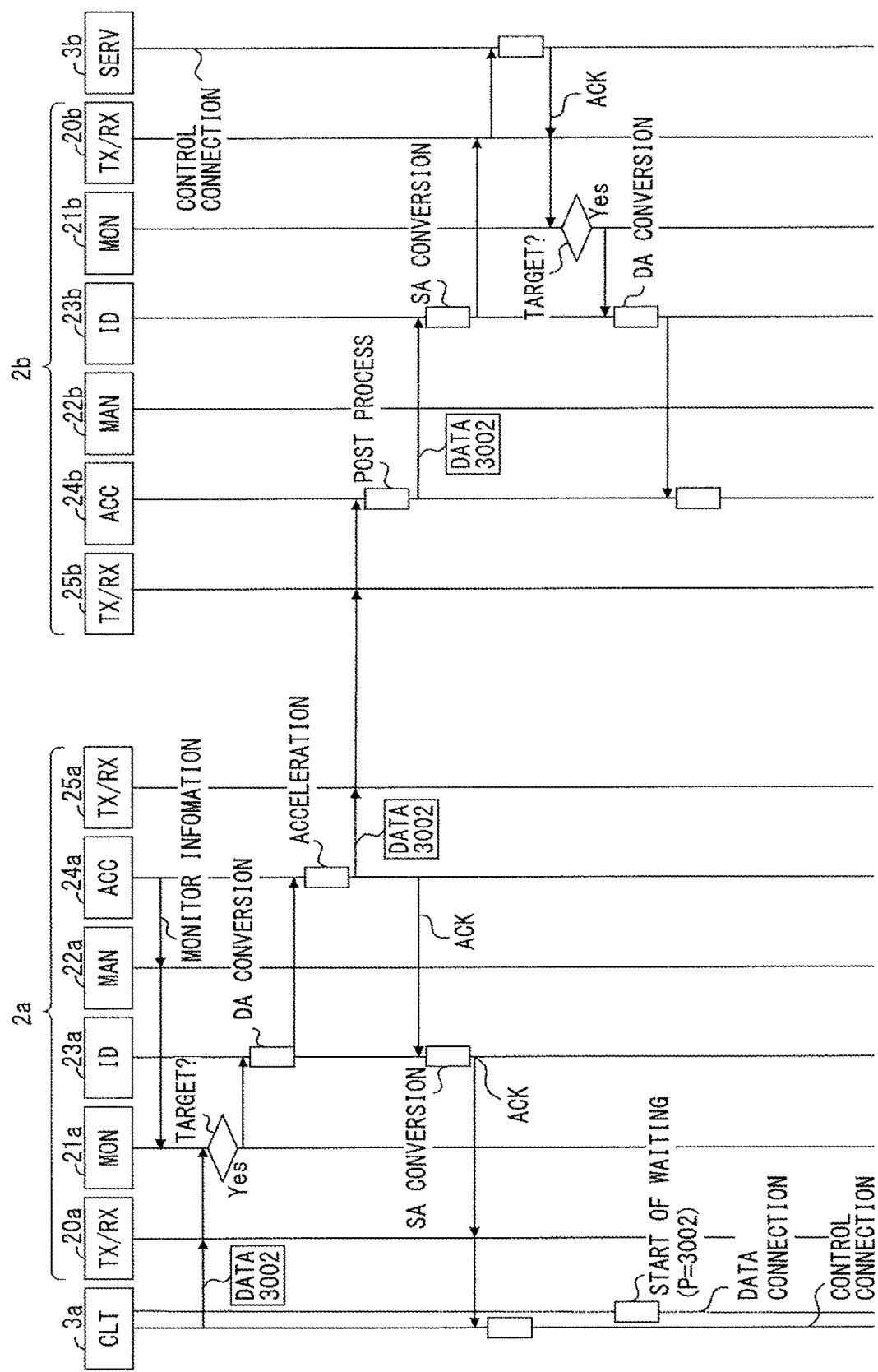
FIGS. 12 and 13 illustrate an example in which a port number is dynamically determined.
Figure 13:
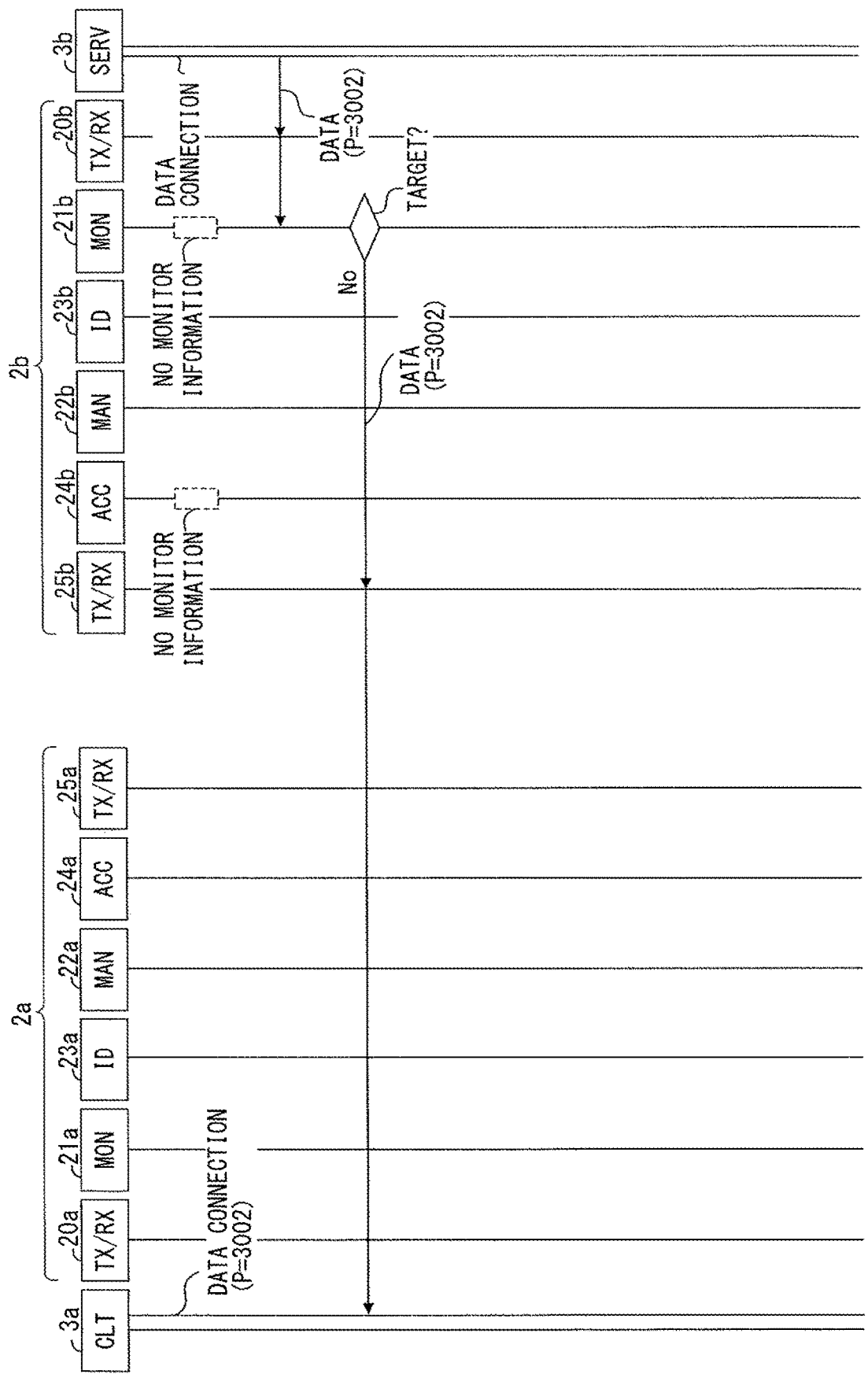

FIGS. 12 and 13 illustrate an example in which a port number is dynamically determined. A client and a server illustrated in FIGS. 12 and 13 are respectively implemented in the communication device 3a and the communication device 3b in the example of FIGS. 1-6 or FIGS. 9 and 10. A transceiver (TX/RX) 20a, a monitor 21a, an ID converter 23a, a manager 22a, an accelerator 24a, and a transceiver (TX/RX) 25a illustrated in FIGS. 12 and 13 respectively correspond to the communication processor 20, the monitor unit 21, the ID converter 23, the manager 22, the accelerator 24, and the second communication processor 25 that are implemented in the relay device 2a in the example of FIGS. 1-6 or FIGS. 9-10. A transceiver (TX/RX) 20b, a monitor 21b, an ID converter 23b, a manager 22b, an accelerator 24b, and a transceiver (TX/RX) 25b illustrated in FIGS. 12 and 13 respectively correspond to the communication processor 20, the monitor unit 21, the ID converter 23, the manager 22, the accelerator 24, and the second communication processor 25 that are implemented in the relay device 2b in the example of FIGS. 1-6 or FIGS. 9-10.

In the communication system having the configuration described above, the server establishes a control connection using a port with number 21, as described above. Thus, in the relay device 2a, the accelerator 24a waits for a packet at the port with number 21. Further, the accelerator 24a generates monitor information. The monitor information indicates that the number of a port to be monitored is "21". Then, the monitor information is given to the monitor 21a through the manager 22a. The monitor information illustrated in FIG. 12 corresponds to the decision criterion in the example illustrated in FIGS. 1-6.

The client transmits a data packet to the server. It is assumed that the client requests that an acceleration process be performed. In this case, the destination port number of the data packet is "21". Here, the data packet corresponds to, for example, a PORT command given in FIG. 11. Thus, the payload of this data packet includes waiting-port-number information that indicates the port number for waiting for a data connection in a client. In this example, the waiting-port-number information indicates "3002".

The destination port number of the data packet is "21". In other words, the data packet is a target of an acceleration process. Thus, the ID converter 23a converts the destination address of the data packet such that the data packet is guided to the accelerator 24a. Further, the accelerator 24a performs an acceleration process on the data packet. Then, the transceiver 25a transmits the data packet to the relay device 2b.

In the relay device 2b, an acceleration post-process is performed by the accelerator 24b. The ID converter 23b converts the source address for the received data packet to the address of the communication device 3a. Then, the server receives this data packet.

The server extracts waiting-port-number information from the received data packet, so as to understand that the port number for waiting for a data connection in the client is "3002". After that, the server generates an ACK packet that corresponds to the received data packet. This ACK packet is terminated by the accelerator 24b in the relay device 2b.

In the relay device 2a, the accelerator 24a also generates an ACK packet that corresponds to the data packet. This ACK packet is forwarded to the communication device 3a and terminated by the client.

It is assumed that the server then transmits the data to the client through a data connection. Thus, the server sets "3002" to be the destination port number of the data packet that is transmitted to the client.

However, in the procedure illustrated in FIG. 12, monitor information that is used to monitor a port number for waiting for a data connection in the client is not set in the relay device 2b. Specifically, as illustrated in FIG. 13, monitor information that guides a data packet whose destination port number is "3002" to the ID converter 23b is not set in the monitor 21b. Further, monitor information that is used to wait for a data packet at a port with number 3002 is not set in the accelerator 24b.

Thus, the data packet transmitted from the server to the client is guided from the monitor 21b to the transceiver 25b without passing through the ID converter 23b and the accelerator 24b. The transceiver 25b transmits the data packet to the relay device 2a. Then, the relay device 2a guides the data packet to the client. In other words, an acceleration process is not performed on a data packet that is transmitted from the server to the client.

As described above, it may be difficult to perform an acceleration process on a data packet in the communication system in which a port number is dynamically determined. Thus, the relay device 2 according to the second embodiment of the present invention includes a function that makes it possible to perform an acceleration process on a data packet even in a communication system in which a port number is dynamically determined. Specifically, the following procedures are performed.

Procedure 1: A client determines a number of a port from among unused ports that is used to receive a packet through a data connection.

Procedure 2: The client transmits waiting-port-number information to a server. In the FTP session illustrated in FIG. 11, the waiting-port-number information is transmitted by use of, for example, a port command (PORT). "X,X,X,X" represents an IP address in the waiting-port-number information "X,X,X,X,A,B". Further, the port number M is represented by a set of an integer A and an integer B. For example, M=256*A+B. In this case, for example, the port with number 3002 is represented by "A=11" and "B=186".

Procedure 3: The relay device 2b implemented on the server side extracts waiting-port-number information from the received packet. Then, monitor information is set in the monitor of the relay device 2b such that a packet having a port number specified by the waiting-port-number information is guided to the ID converter in the relay device 2b. In addition, a setting for performing an acceleration process on the packet having the port number specified by the waiting-port-number information is performed.

Procedure 4: The relay device 2b forwards the received packet to the server.

Procedure 5: When data forwarding is completed, the setting performed by Procedure 3 is deleted.

Figure 14:
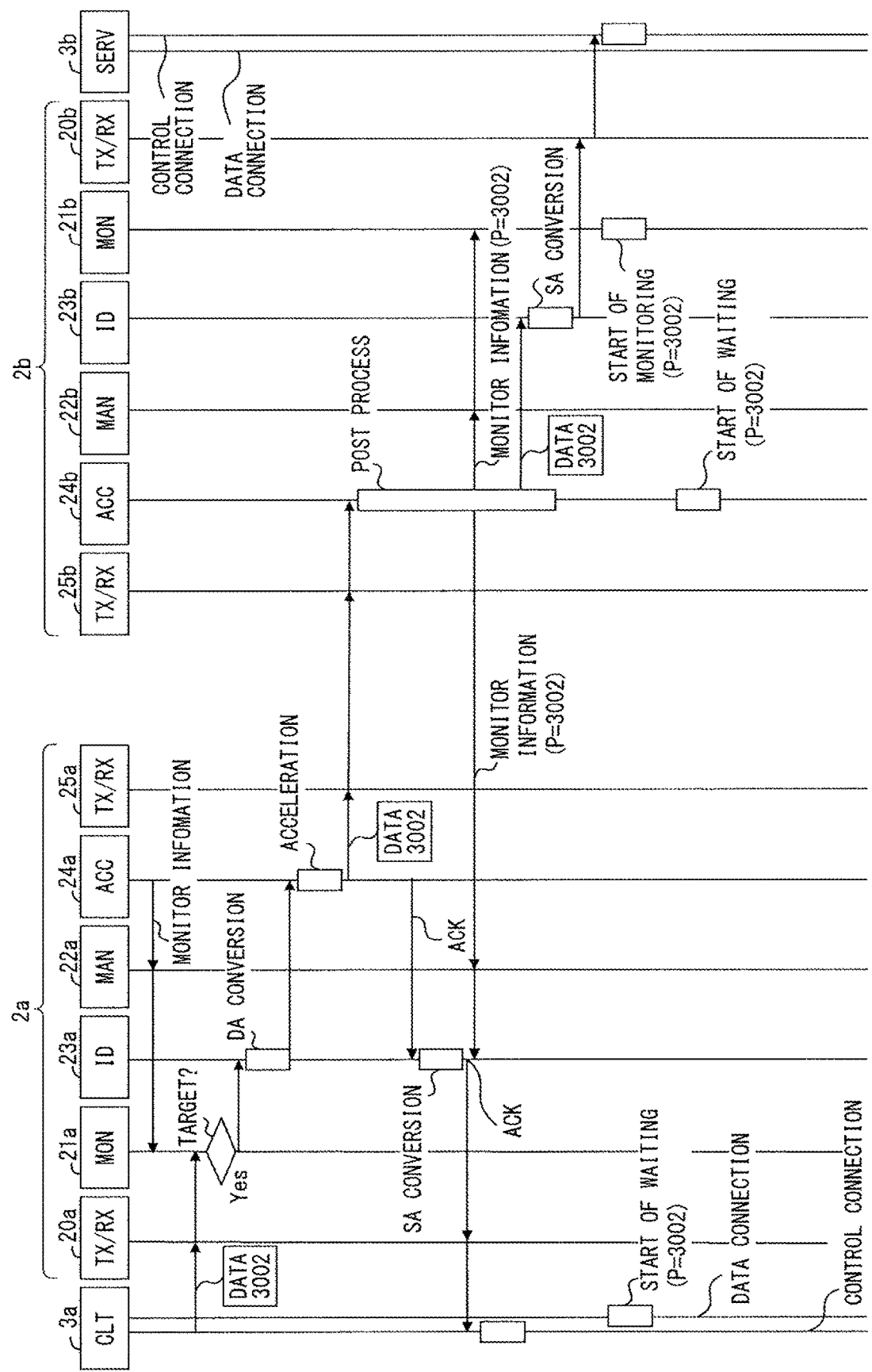
FIGS. 14 and 15 are an example of a sequence for establishing a data connection in a second embodiment.
Figure 15:
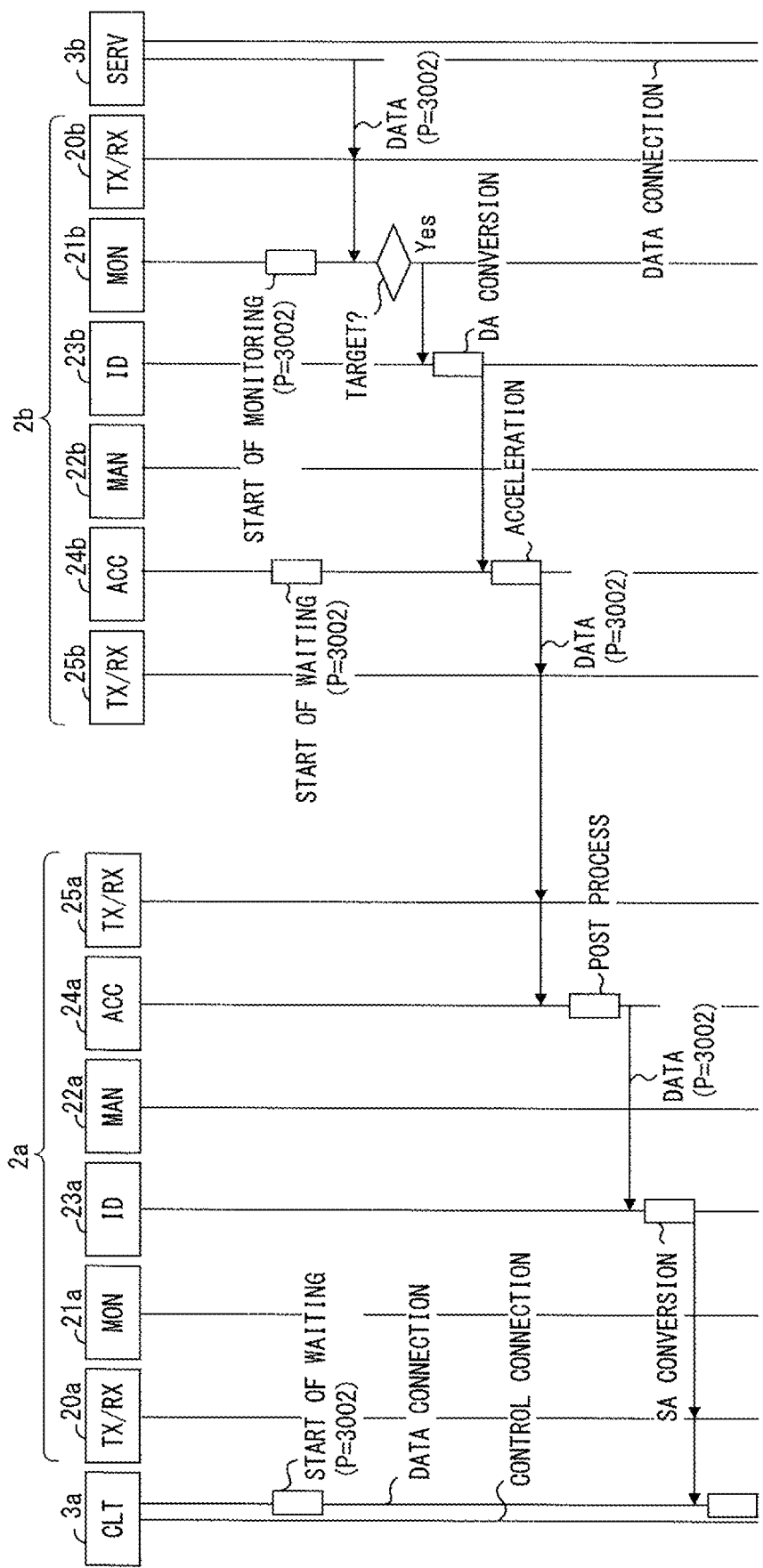

FIGS. 14 and 15 are an example of a sequence for establishing a data connection in the second embodiment. The procedure for forwarding a data packet including waiting-port-number information from a client implemented in the communication device 3a to a server implemented in the communication device 3b is substantially the same in FIGS. 12 and 14. Thus, also in the sequence illustrated in FIG. 14, the transceiver (TX/RX) 25b of the relay device 2b receives a data packet including waiting-port-number information.

In the relay device 2b, the transceiver 25b guides the received data packet to the accelerator 24b. Then, the accelerator 24b performs an acceleration post-process on the data packet. Next, the accelerator 24b obtains waiting-port-number information from the data packet. Then, the accelerator 24b performs a setting for performing an acceleration process on a packet having a port number specified by the waiting-port-number information. Specifically, the accelerator 24b starts waiting for a packet having a port number specified by the waiting-port-number information. In this example, the waiting-port-number information specifies a port with number 3002, so the accelerator 24b starts waiting for a packet whose destination port number is "3002".

The waiting-port-number information obtained by the accelerator 24b is set, as monitor information, in the monitor 21b through the manager 22b. Then, the monitor 21b starts performing monitoring according to the monitor information. In other words, the monitor 21b starts monitoring a packet having a port number (3002, in this example) specified by the waiting-port-number information.

Further, the monitor information is also transmitted to the relay device 2a. In the relay device 2a, the monitor information is set in the ID converter 23a by the manager 22a. Then, the ID converter 23a starts waiting for a packet according to the monitor information. In other words, the ID converter 23a starts waiting for a packet having a port number (3002, in this example) specified by the waiting-port-number information.

The data packet on which an acceleration post-process has been performed in the accelerator 24b is forwarded to the server through the ID converter 23b and the transceiver 20b. This forwarding procedure is substantially the same in FIGS. and 14, so its description is omitted. Further, the procedure in which the server generates an ACK packet and returns it is omitted in FIG. 14.

As described above, when a port number used to receive a packet through a data connection is reported from a relay device on the client side to a relay device on the server side, the relay device on the server side obtains the port number. Then, the relay device on the server side starts monitoring and waiting for a packet having that port number.

It is assumed that, after that, the server transmits the data to the client through a data connection. Thus, the server sets "3002" to be the destination port number of a data packet that is transmitted to the client.

As illustrated in FIG. 15, this data packet is guided from the transceiver 20b to the monitor 21b. Here, the monitor 21b monitors a packet whose destination port number is "3002" after the setting illustrated in FIG. 14. Thus, the data packet transmitted from the server is guided to the ID converter 23b. The ID converter 23b converts the destination address for the received data packet from the communication device 3a to the relay device 2b according to correspondence information prepared in the embodiment illustrated in FIGS. 1-6. In this case, the data packet is guided to the accelerator 24b.

After the setting illustrated in FIG. 14, the accelerator 24b waits for a packet whose destination port number is "3002". Therefore, the accelerator 24b performs an acceleration process on the received data packet. Here, the header of the data packet is updated such that the source of the data packet is the relay device 2b and the destination of the data packet is the relay device 2a. The data packet on which the acceleration process has been performed is transmitted to the relay device 2a by the transceiver 25b.

In the relay device 2a, the received data packet is guided to the accelerator 24a. Then, after an acceleration post-process is performed on the data packet by the accelerator 24a, the data packet is guided to the ID converter 23a. The ID converter 23a converts the source of the data packet from the relay device 2b to the communication device 3b (that is, the server). Then, this data packet is forwarded to the communication device 3a (that is, the client) by the transceiver 20a.

As described above, when a port number for receiving a packet is dynamically determined, monitoring and waiting for a packet having the newly determined port number are started in each relay device. Thus, even when a port number for receiving a packet through a data connection is dynamically determined, an acceleration process can be applied to this data connection.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A communication relay device that receives a packet transmitted from a first communication device to a second communication device from the first communication device and forwards the packet to a correspondent communication relay device, the communication relay device comprising:
    a processor configured to extract, from a request packet that requests a connection to the second communication device, a first identifier for indicating the first communication device that is a source of the request packet and a second identifier for indicating the second communication device that is a destination of the request packet, when the communication relay device receives the request packet from the first communication device, and to generate configuration information including the first identifier and the second identifier;
    a communication processor configured to transmit the configuration information to the correspondent communication relay device such that the correspondent communication relay device converts source information of the packet transmitted from the first communication device to the second communication device based on the configuration information and forwards the packet for which the source information has been converted to the second communication device; and
    an acceleration processor configured to perform an acceleration process to accelerate a transmission on a network between the communication relay device and the correspondent communication relay device,
    the processor decides whether the packet transmitted from the first communication device to the second communication device is a target of the acceleration process,
    when the packet is the target of the acceleration process,
        the processor guides the packet to the acceleration processor,
        the acceleration processor performs the acceleration process for the packet,
        the source information of the packet is converted from the first identifier into a third identifier for indicating the communication relay device in the acceleration process,
        the communication processor transmits the packet for which the acceleration process has been performed to the correspondent communication relay device,
        the correspondent communication relay device converts the source information of the packet from the third identifier into the first identifier based on the configuration information.

2. The communication relay device according to claim 1 wherein the processor converts source information of a response packet that responds to the packet transmitted from the first communication device to the second communication device into the second identifier according to the configuration information.

3. A communication relay device that receives, from a correspondent communication relay device, a packet transmitted from a first communication device to a second communication device and that forwards the packet to the second communication device, the communication relay device comprising:
  a processor configured
    to obtain configuration information from the correspondent communication relay device, the configuration information including a first identifier for indicating the first communication device and a second identifier for indicating the second communication device,
    to convert the source information of the packet transmitted from the first communication device to the second communication device based on the configuration information when the communication relay device receives the packet transmitted from the first communication device to the second communication device; and
  a communication processor configured to forward the packet for which the source information has been converted to the second communication device,
  the correspondent communication relay device includes an acceleration processor that performs an acceleration process to accelerate a transmission on a network between the correspondent communication relay device and the communication relay device,
  when the packet is a target of the acceleration process,
    the acceleration processor perform the acceleration process for the packet,
    the source information of the packet is converted from the first identifier into a third identifier for indicating the correspondent communication relay device in the acceleration process,
    the packet for which the acceleration process has been performed is transmitted from the correspondent communication relay device to the communication relay device, and
  the processor converts the source information of the packet from the third identifier into the first identifier based on the configuration information.

4. A relay system that relays communication between a first communication device and a second communication device, the relay system comprising:
  a first relay device that is connected to the first communication device through a first network; and
  a second relay device that is connected to the second communication device through a second network,
  the first relay device comprises:
    a first processor that extracts, from a request packet that requests a connection between the first communication device and the second communication device, a first identifier for indicating the first communication device that is a source of the request packet and a second identifier for indicating the second communication device that is a destination of the request packet, when the first relay device receives the request packet from the first communication device, and generates configuration information including the first identifier and the second identifier,
    a first communication processor that transmits the configuration information to the second relay device, and
    an acceleration processor that performs an acceleration process to accelerate a transmission on a third network between the first relay device and the second relay device, and
  the second relay device comprises:
    a second processor that converts the source information of the packet transmitted from the first communication device to the second communication device based on the configuration information when the second relay device receives the packet transmitted from the first communication device to the second communication device, and
    a second communication processor that forwards the packet for which the source information has been converted to the second communication device,
  when the packet transmitted from the first communication device to the second communication device is a target of the acceleration process,
    the first processor guides the packet to the acceleration processor,
    the acceleration processor perform the acceleration process for the packet,
    the source information of the packet is converted from the first identifier into a third identifier for indicating the first relay device in the acceleration process,
    the first communication processor transmits the packet for which the acceleration process has been performed to the second relay device, and
    the second processor converts the source information of the packet from the third identifier into the first identifier based on the configuration information.

* * * * *